(12) United States Patent
Liu et al.

(10) Patent No.: US 11,775,290 B2
(45) Date of Patent: Oct. 3, 2023

(54) DETECTION OF API BACKWARD COMPATIBILITY ACROSS SOFTWARE VERSIONS

(71) Applicant: FUJITSU LIMITED, Kawasaki (JP)

(72) Inventors: Lei Liu, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/444,592

(22) Filed: Aug. 6, 2021

(65) Prior Publication Data

US 2023/0049741 A1 Feb. 16, 2023

(51) Int. Cl.
   *G06F 8/71* (2018.01)
   *G06F 8/51* (2018.01)
   *G06F 8/76* (2018.01)
   *G06F 8/36* (2018.01)

(52) U.S. Cl.
   CPC .................. *G06F 8/71* (2013.01); *G06F 8/36* (2013.01); *G06F 8/51* (2013.01); *G06F 8/76* (2013.01)

(58) Field of Classification Search
   None
   See application file for complete search history.

(56) References Cited

U.S. PATENT DOCUMENTS

| | | | | |
|---|---|---|---|---|
| 6,651,186 B1* | 11/2003 | Schwabe | ............. | G06F 9/44589 714/38.14 |
| 6,883,163 B1* | 4/2005 | Schwabe | ............. | G06F 9/44589 717/124 |
| 6,986,132 B1* | 1/2006 | Schwabe | ............. | G06F 9/44589 717/170 |
| 8,539,475 B2* | 9/2013 | Ershov | ................ | G06F 11/3604 717/170 |
| 8,997,069 B2* | 3/2015 | Fanning | .................... | G06F 9/54 717/143 |
| 9,058,343 B2* | 6/2015 | Cohen | .................... | G06Q 30/08 |
| 9,063,817 B2* | 6/2015 | Dorn | ......................... | G06F 8/65 |

(Continued)

OTHER PUBLICATIONS

Brito, Aline, et al. "Why and how Java developers break APIs." 2018 IEEE 25th International Conference on Software Analysis, Evolution and Reengineering (SANER). IEEE, 2018. (Year: 2018).*

(Continued)

*Primary Examiner* — Matthew J Brophy
(74) *Attorney, Agent, or Firm* — Fujitsu Patent Center

(57) ABSTRACT

According to an aspect of an embodiment, operations for detection of API compatibility across software versions are provided. The operations may include receiving an input associated with a software application. The operations may further include determining first information. The operations may further include extracting a set of data from one or more web-based sources based on the determined first information. The operations may further include executing a set of operations including one or more pattern searching operations on the extracted set of data to generate a compatibility result. The operations may further include controlling a display device based on the generated compatibility result. The display device may be controlled to display assistive information which informs about a compatibility of the one or more APIs or the functions used in the source code of the software application with respect to the second version of the software.

19 Claims, 18 Drawing Sheets

(56) References Cited

U.S. PATENT DOCUMENTS

| | | | | |
|---|---|---|---|---|
| 9,424,025 | B2* | 8/2016 | Ahmed | G06F 8/71 |
| 9,430,228 | B2* | 8/2016 | Ahmed | G06F 8/71 |
| 10,169,034 | B2* | 1/2019 | Ahmed | G06F 8/71 |
| 10,394,552 | B2* | 8/2019 | Elkabany | G06F 8/71 |
| 10,684,846 | B2* | 6/2020 | Ghiondea | G06F 8/65 |
| 11,550,758 | B2* | 1/2023 | Maddila | G06Q 10/06 |
| 2005/0188356 | A1* | 8/2005 | Lwo | G06F 8/71 717/120 |
| 2007/0006222 | A1* | 1/2007 | Maier | G06F 8/61 717/170 |
| 2007/0083874 | A1* | 4/2007 | Vasudevan | G06F 8/65 719/328 |
| 2008/0082974 | A1* | 4/2008 | Ellison | G06F 8/71 717/170 |
| 2008/0177994 | A1* | 7/2008 | Mayer | G06F 16/00 709/224 |
| 2011/0078674 | A1* | 3/2011 | Ershov | G06F 8/75 717/170 |
| 2014/0366011 | A1* | 12/2014 | Rector | G06F 8/71 717/170 |
| 2017/0337052 | A1* | 11/2017 | Elkabany | G06F 8/71 |
| 2020/0242254 | A1* | 7/2020 | Velur | G06F 21/552 |

OTHER PUBLICATIONS

He, Dongjie, et al. "Understanding and detecting evolution-induced compatibility issues in android apps." 2018 33rd IEEE/ACM International Conference on Automated Software Engineering (ASE). IEEE, 2018. (Year: 2018).*

Li, Li, et al. "Cid: Automating the detection of api-related compatibility issues in android apps." Proceedings of the 27th ACM SIGSOFT International Symposium on Software Testing and Analysis. 2018. (Year: 2018).*

Wei, Lili, Yepang Liu, and Shing-Chi Cheung. "Taming android fragmentation: Characterizing and detecting compatibility issues for android apps." Proceedings of the 31st IEEE/ACM International Conference on Automated Software Engineering. 2016. (Year: 2016).*

Brito, Aline, et al. "APIDiff: Detecting API breaking changes." 2018 IEEE 25th International Conference on Software Analysis, Evolution and Reengineering (SANER). IEEE, 2018. (Year: 2018).*

* cited by examiner

DETECTION OF API BACKWARD COMPATIBILITY ACROSS SOFTWARE VERSIONS

FIELD

The embodiments discussed in the present disclosure are related detection of application programming interface (API) backward compatibility across software versions.

BACKGROUND

In software development, version control is an important practice that helps to keep track of changes in a source code of a software. Typically, developers and organizations publish documents that details changes introduced in the source code of a newer version of their software in comparison to previous version(s) of the software. The software may be updated to a new version to add new functionalities. replace or remove existing functionalities, and to fix bugs/exceptions raised in the older versions of the source code. Typically, the software may include methods or functions that a user may use in a source code of his/her own application. For example, the software may expose methods that may be called by executing Application Programming Interface (API) call codes, included the source code of the application. With a release of a newer version, the software may include changes in the source code. For example, the methods exposed in an older version of the software may change in the newer version. In some instances, such changes may result in breaking of a backward compatibility of the software. Any application that invokes such methods may not function appropriately. In some instances, the application may encounter errors or may crash.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include receiving an input associated with a software application. The operations may further include determining, based on the input, first information about: one or more Application programming interfaces (APIs) or functions which may be used in a source code of the software application, and a first version of a software which provides the one or more APIs or the functions. The operations may further include extracting a set of data from one or more web-based sources, based on the determined first information. The extracted set of data may include one or more changes in a source code of a second version of the software. The second version of the software may be different from the first version of the software. The extracted set of data may further include second information about the one or more changes in the second version. The operations may further include executing a set of operations including pattern searching operations on the extracted set of data to generate a backward compatibility result. The operations may further include controlling a display device to display assistive information which informs about a compatibility of the one or more APIs or the functions used in the source code of the software application with respect to the second version of the software. The display device may be controlled based on the generated backward compatibility result.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

Figure 1:
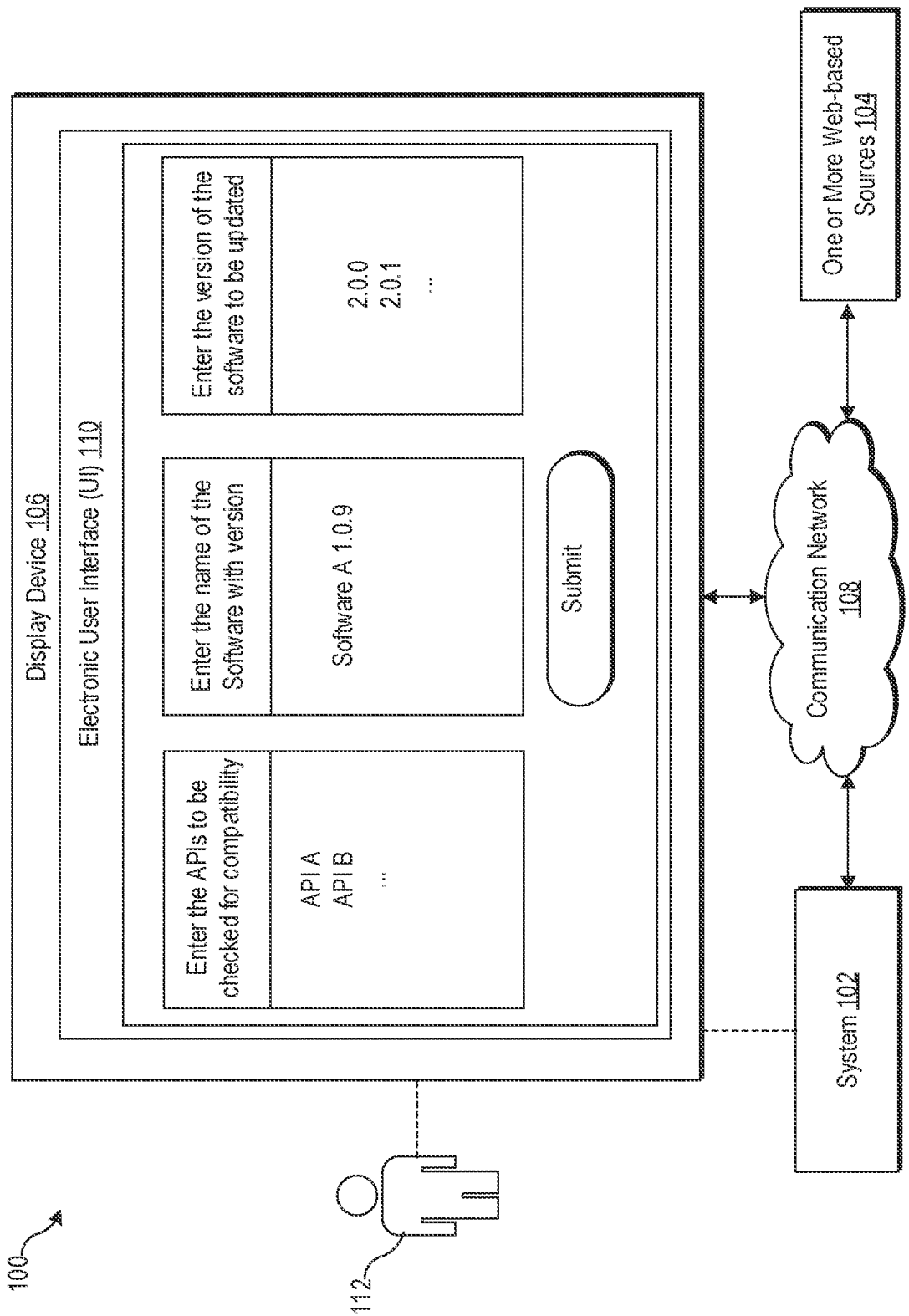
FIG. 1 is a diagram representing an exemplary environment related to detection of API backward compatibility across software versions.

all according to at least one embodiment described in the present disclosure.

DESCRIPTION OF EMBODIMENTS

Open Source Software (OSS) is becoming more important in the current industry. Web-based repository hosting systems, such as GitHub® have a large community of developers and organizations for building and sharing open-source software. These open source software are used by various client applications with the help of APIs that allows interaction between a client application and the open source software. With the vast amount of developers and organizations, these open source software are updated frequently. However, after the update of the OSS, the APIs may not work in the required manner or may not work at all. This may lead to unavailability of one or more functions in the client application or even crashing of client application.

With the rapid increase in the number of updates to the OSS, the OSS may provide more functionalities that may be consumed via Application programming interfaces (APIs) and may be further integrated in the client application. Moreover, these updates to the OSS may fix some issues in the previous versions of the OSS. Therefore, the client may also wish to update the version of the OSS used by the client application for more security and/or enhancing the functionality of the client application.

Before upgrading the OSS, the client may wish to know whether the API (or the upgraded OSS) is backward compatible or not. In general, backward compatibility (backwards compatibility) refers to a hardware system or software system that can successfully use interfaces and data from earlier versions of the system or with other systems. An API may be said to be backward compatible if the client application (a program written to consume the API) that works with one version of the API can work the same way with future versions of the API. In other words, the API is backward compatible between releases if the clients are able to work with a new version of the API seamlessly (i.e. without any modification in a source code of client application).

Traditional approaches for detecting backward compatibility may include comparing two version of the source code of software and further detecting the backward compatibility based on the comparison. This approach can be considered as a static approach as this approach does not consider a dynamic behavior of the source codes, that most of the source codes exhibits. Moreover, this approach uses only one decision marker associated with the codes to check the backward compatibility. In some scenarios, details about some significant changes (like changes in environment variables, secret keys, etc.) may not be reflected in the code but written in some other files (especially textual files) associated with the upgraded software. Thus, this approach may give false positives. As this approach is associated with codes of two different versions only, this approach may cover only a small fraction of all the possible backward compatibility problems.

Other approaches for checking for the backward compatibility are specific to different categories of software. Each approach may be applicable for only single category of software (such as database schema) only. Since, these approaches are associated with the category of software, a generalized approach is required that can detect the backward compatibility of all the software irrespective of their categories.

Some embodiments described in the present disclosure relate to a method and a non-transitory computer-readable medium for detection of API backward compatibility across software versions. The disclosed system may be capable checking the compatibility for each software and may not be limited to a particular category. Moreover, the disclosed system may use at least two decision parameters to check whether the API (or the OSS) is backward compatible or not.

A first decision parameter may be associated with the source code in both the versions of the software and the second decision parameter may be associated with a textual description that may be written by a programmer about the updates in the updated version of the software. Therefore, the disclosed system may check the backward compatibility based on two or more than two decision parameters unlike the traditional approaches that use only one decision parameter. Also, the disclosed system may define comprehensive rules and procedures so that most of the possible backward compatibility problems may be covered in comparison to the previous approaches that may be capable of detecting only a small fraction of all possible backward compatibility problems.

Embodiments of the present disclosure are explained with reference to the accompanying drawings.

FIG. 1 is a diagram representing an exemplary environment related to detection of API backward compatibility across software versions, arranged in accordance with at least one embodiment described in the present disclosure. With reference to FIG. 1, there is shown an example environment 100. In the example environment 100, there is shown a system 102 and one or more web-based sources 104. The one or more web-based sources 104 may host a collection of software or store data associated with the collection of software. There is further shown a display device 106, a communication network 108, and an electronic user interface (UI) 110 rendered onto a display screen of the display device 106. The system 102, the one or more web-based sources 104, and the display device 106 may be communicatively coupled to each other, via the communication network 108.

There is further shown a user 112 who may be associated with the display device 106. The display device 106 may include suitable logic, circuitry, and interfaces that may be configured to receive input(s) from the user 112 and display assistive information on the electronic UI 110. In an embodiment, the display device 106 may be a touch screen which may enable the user 112 to provide one or more inputs via the electronic UI 110 rendered on the display device 106. The touch screen may be at least one of a resistive touch screen, a capacitive touch screen, or a thermal touch screen. The display device 106 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 106 may refer to a display screen of a head mounted device (HMD), a smart-glass device, a see-through display, a projection-based display, an electro-chromic display, or a transparent display.

In an embodiment, the display device 106 may correspond to a user device associated with the user 112. The user 112 may interact with the system 102 via the user device. Examples of the user device 106 may include, but are not limited to, a mobile device, a desktop computer, a laptop, a computer workstation, a server, such as a cloud server, or a group of servers. In one or more embodiments, the user device may include a user-end terminal device and a server communicatively coupled to the user-end terminal device. Examples of the user-end terminal device may include, but are not limited to, a mobile device, a desktop computer, a laptop, or a computer workstation.

The one or more web-based sources 104 may include suitable logic, circuitry, and interfaces that may be configured to store information associated with a collection of software. Each software in the collection may be used for application development. Specifically, the software may expose or provide one or more APIs. The user 112 may have to include API call codes or methods of the API in a source code of their software application. Each software in the collection may correspond to an OSS, a Free and Open Source Software (FOSS), a Free/Libre and Open Source Software (FLOSS), or a Proprietary software. Examples of the one or more web-based sources 104 may include, but are not limited to, a web-based code hosting server, a database server, a file server, a web server, a Really Simple Syndication (RSS) feed, and a server that hosts website(s) and web application(s).

In an embodiment, the one or more web-based sources 104 may be implemented as servers, which may include storage distributed across one or more availability zones (e.g., datacenters). In another embodiment, each web-based source may include a front-end system and a back-end system. The front-end system may be configured to provide an interface (such as webpages or a client-side interface of a web-application) to view information associated with a software. The back-end system may store databases, logic, and instructions to process requests by the front-end system to access the information associated with the software.

In an embodiment, the one or more web-based sources 104 may host a software (or a collection of software) and may allow individuals and/or organizations to manage the software through a web-based interface. In another embodiment, the web-based source may be a software hosting system which includes webpages on a software. The webpages may include links to a source code (if the software is OSS) of the software and other software-related files, such as a documentation, a change log, a readme file with a description of the corresponding software, test results, API reference guide, and other additional links or references. Users (including the user 112) may be able to access the collection of software through an API call, a web-client (for example, a web browser), or a command-line interface.

The user 112 may be a developer (or a group of developers) of a software application. The software application may be using one or more APIs or functions in the source code of the software application. For example, the source code may include an API call code or a function code corresponding to specific operations or tasks of the software application. Such APIs or functions may be provided by a first version of software, which may be hosted on the one or more web-based sources 104.

At any-time, the software that provides the one or more APIs or functions may be updated from the first version to a second version. The second version of the software may include changes in the source code of the first version of the software. For example, the changes may include a modification in function/method definitions and number and type of I/O parameters for functions, deprecation of existing functions, and addition of new API methods or functions. In some instances, the changes may include syntax-related changes that may be introduced in the second version if the first version is upgraded to support a newer version of a programming language. Some of the changes may be fixes introduced in the second version of the software to remove bugs present in the first version of the software.

Due to such changes, it is possible that a portion of the source code of the software application causes an error during execution. The portion of the source code may include a reference or a call to an API or a function provided by the first version of the software. The error may be caused if some of the APIs or functions in the first version of the software are backward incompatible with the second version of the software. The user 112 may want to avoid the issue of backward incompatibility. Therefore, the source core (or at least the portion of the source code) may need to be checked for backward compatibility and updated with changes that make the source code of the software application compatible with the second version of the software.

Before updating, it may be checked whether the second version of the software is backward compatible or not with the first version of the software. In case the second version of the software is not backward compatible, the source code or a portion of the source code of the software application may have to be modified. In case the second version of the software is backward compatible, the software application may not encounter any errors during execution as a result of backward compatibility. In such a case, no modification in the source code of the software application may be required.

To detect whether the second version of the software is backward compatible, a set of operations may be performed, as described herein. The system 102 may be configured to receive an input associated with the software application. The software application may be a user application, developed or managed by the user 112. For example, the software application may be developed by the user 112 through a low-code, a no-code, or a code-based application development platform. The received input may include, for example, the source code of the software application or a portion of the source code which may be associated with the one or more APIs or the functions (which may be used in the source code of the software application). In some instances, the received input may include textual information. The textual information may include first data associated with the one or more APIs or the functions, second data associated with a name of the software that provides the one or more APIs or the functions, and third data associated with the first version of the software. For example, the textual information may include Apache POI as the name of the API, Apache as the software that provides the Apache POI API, and 5.0 as the version of the Apache POI API.

The system 102 may be configured to determine first information about the one or more APIs or functions which may be used in the source code of the software application. In addition, the determined first information may be about the first version of the software which provides the one or more APIs or the functions. The first information may be determined based on the received input. Details about the determination of the one or more APIs or functions from the source code of the software application are provided, for example, in FIG. 5.

The system 102 may be further configured to extract a set of data from the one or more web-based sources 104 based on the determined first information. The extracted set of data may include one or more changes in a source code of a second version of the software, with respect to source code of the first version of the software. The second version of the software may be different from the first version of the software. For example, the second version may be an upgrade over the first version of the software. In an embodiment, the extracted set of data may include a first file that includes the source code of the second version of the software, a second file that includes the second information about the one or more changes in the source code of the second version, a third file that includes a description of the software, and a set of first messages associated with one or more changes introduced in the source code of the second version of the software.

The system 102 may be further configured to execute a set of operations on the extracted set of data to generate a compatibility result. The set of operations may include pattern searching operations, such as string searching operations (using regular expressions (regex)). Details about the set of operations and the pattern searching operations are provided, for example, in FIG. 8, FIG. 10, FIG. 12, FIG. 13, FIG. 14, FIG. 15, and FIG. 16.

The system 102 may be further configured to control the display device 106 based on the generated compatibility result. The display device 106 may be controlled to display assistive information that may inform about a compatibility of the one or more APIs or the functions used in the first source code, with respect to the second version of the software. If the second version of the software is a newer version or a later version of the software in comparison to the first version, then the compatibility of such APIs or functions may be referred to as a backward compatibility. Alternatively, if the second version of the software is an older version of the software in comparison to the first version, then the compatibility of such APIs or functions may be referred to as a forward compatibility.

It should be noted that the communication between the system 102, the one or more web-based sources 104, and the display device 106 may be performed via the communication network 108. The communication network 108 may include a communication medium through which the system 102 may communicate with the one or more web-based sources 104, the display device 106, and/or different devices (not shown). Examples of the communication network 108 may include, but are not limited to, the Internet, a cloud network, a cellular network (such as a 4th Generation Long-Term Evolution (LTE) or 5th generation New Radio (NR)), a Wireless Fidelity (Wi-Fi) network, a Personal Area Network (PAN), a Local Area Network (LAN), and/or a Metropolitan Area Network (MAN). Various devices in the example environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity(Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to the system 102 without departing from the scope of the present disclosure. For example, in some embodiments, the system 102 may include any number of other components that may not be explicitly illustrated or described.

Figure 2:
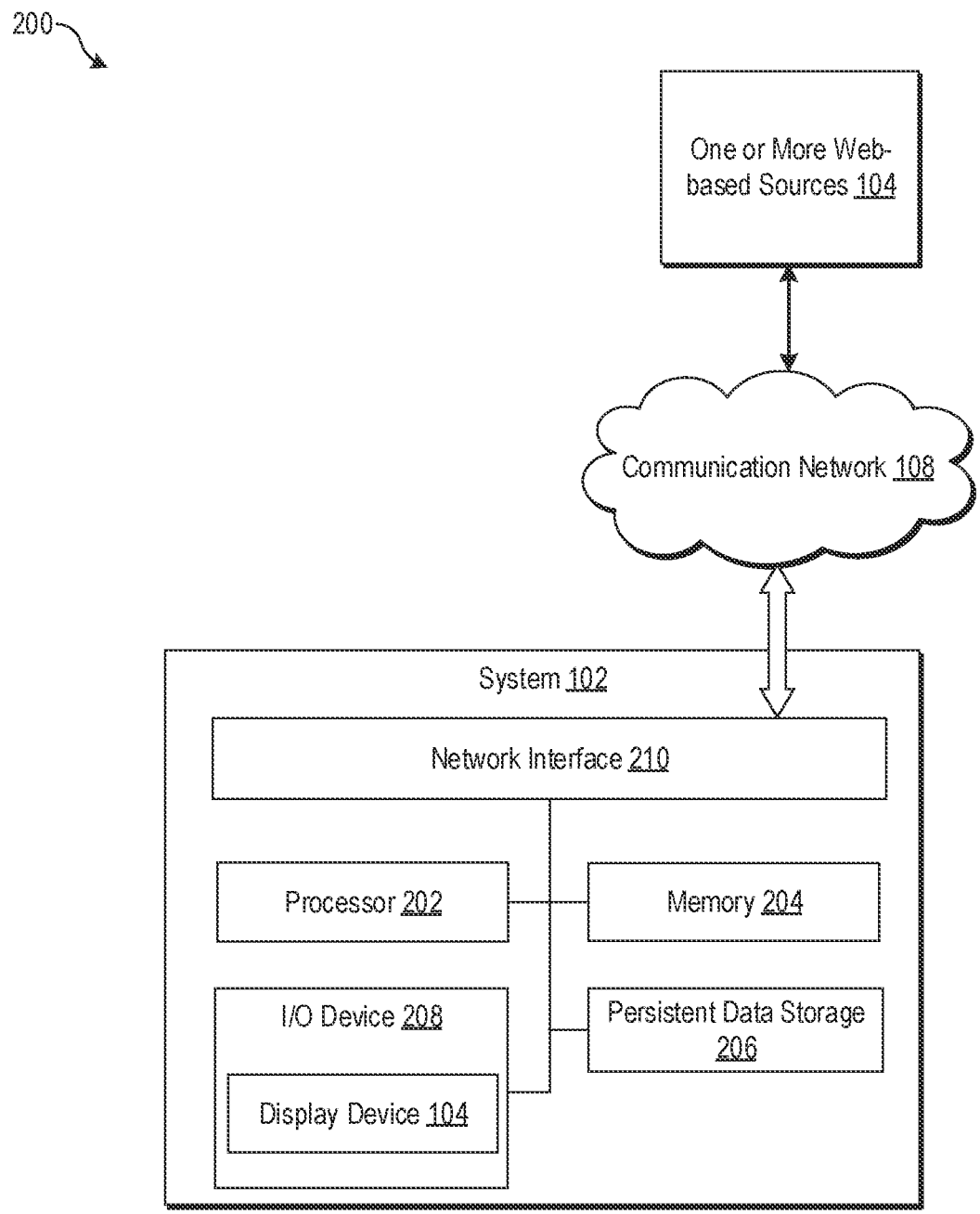
FIG. 2 is a block diagram of a system for detection of API backward compatibility across software versions.

FIG. 2 is a block diagram of a system for detection of API backward compatibility across software versions, arranged in accordance with at least one embodiment described in the present disclosure. FIG. 2 is explained in conjunction with elements from FIG. 1. With reference to FIG. 2, there is shown a block diagram 200 of the system 102 of FIG. 1. The system 102 may include a processor 202, a memory 204, and a persistent data storage 206. In some embodiments, the system 102 may also include an input/output (I/O) device 208 that may include a network interface 210 and the display device 104. There is further shown the one or more web-based sources 104 that may be communicatively coupled to the system 102.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device, including various computer hardware or software modules, and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into memory 204, the processor 202 may execute the program instructions. Some of the examples of the processor 202 may be a Central Processing Unit (CPU), a Reduced Instruction Set Computer (RISC) processor, an ASIC processor, a Complex Instruction Set Computer (CISC) processor, a Graphical Processing Unit (GPU), a co-processor, and/or a combination thereof.

The memory 204 may include suitable logic, circuitry, and/or interfaces that may be configured to store program instructions executable by the processor 202. In certain embodiments, the memory 204 may be configured to store the received input, and the determined first information associated with the one or more APIs or the functions, and the first version of the software. In certain embodiments, the memory 204 may be configured to store the extracted set of data, the second information. The memory 204 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media, including Random Access Memory (RAM), Read-Only Memory (ROM), Electronically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, and/or interfaces that may be configured to store program instructions executable by the processor 202. In an embodiment, the persistent data storage 206 may be configured to store a first file, a second file, a third file, and a set of messages. In some other embodiments, the persistent data storage 206 may be configured to store one or more tags associated with the compatibility. The persistent data storage 206 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The I/O device 208 may include suitable logic, circuitry, interfaces, and/or code that may be configured to receive one or more inputs. The I/O device 208 may be further configured to provide an output in response to the one or more inputs. The I/O device 208 may include various input and output devices, which may be configured to communicate with the processor 202 and other components, such as the network interface 210. Examples of the input devices may include, but are not limited to, a touch screen, a keyboard, a mouse, a joystick, and/or a microphone. Examples of the output devices may include, but are not limited to, a display device 106 and a speaker.

The network interface 210 may include suitable logic, circuitry, interfaces, and/or code that may be configured to establish a communication among the system 102, the one or more web-based sources 104, and the display device 106 via the communication network 108. The network interface 210 may be implemented by use of various known technologies to support wired or wireless communication of the system 102, via the communication network 116. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

The functions or operations executed by the system 102, as described in FIG. 1, may be performed by the processor 202. Operations executed by the processor 202 are described in detail, for example, in FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, and FIG. 18.

Figure 3:
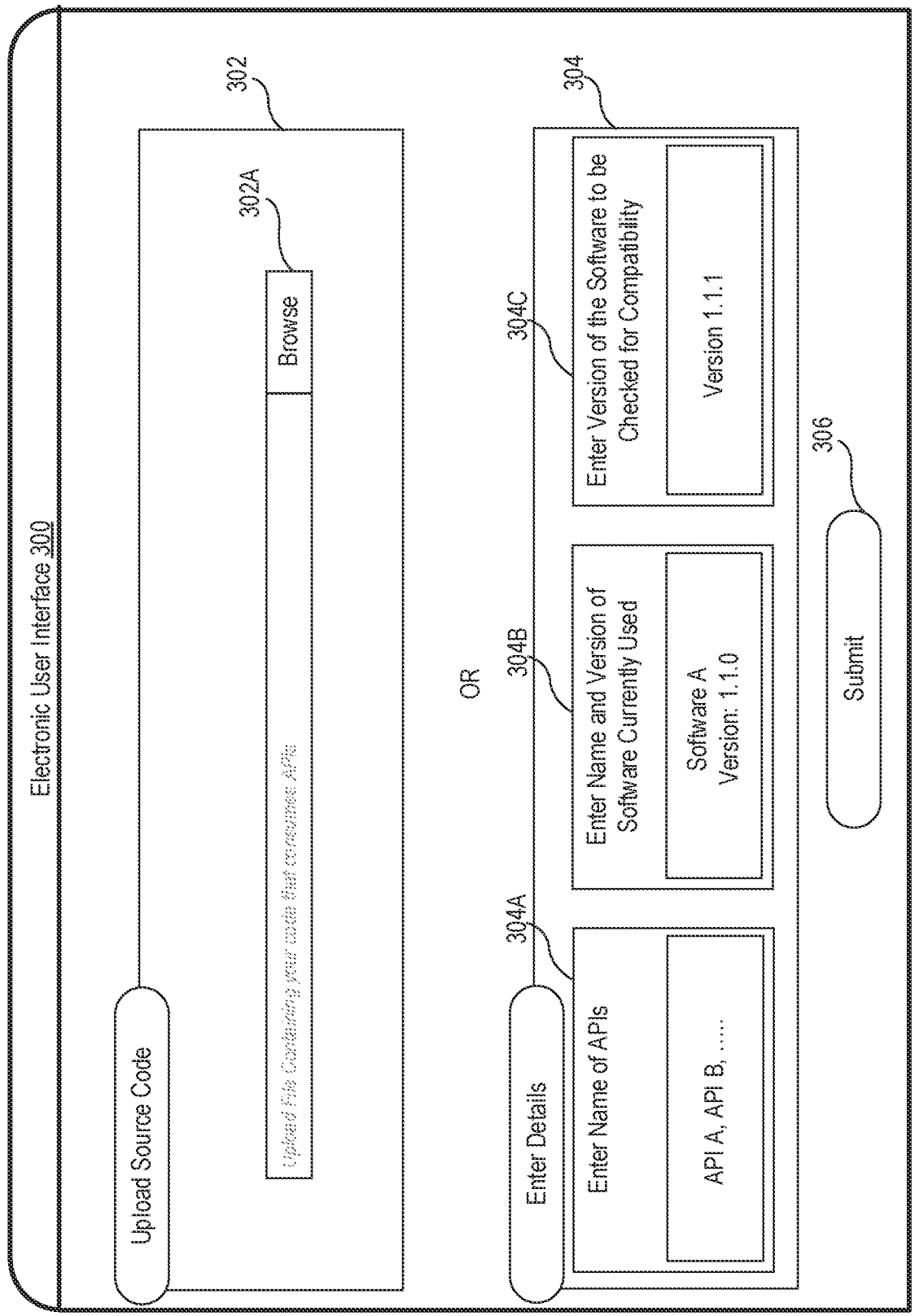
FIG. 3 illustrates an example electronic user interface (UI) for providing input(s) for detection of API backward compatibility across software versions.

FIG. 3 illustrates an example electronic user interface (UI) for providing input(s) for detection of API backward compatibility across software versions, according to at least one embodiment described in the present disclosure. FIG. 3 is explained in conjunction with elements from FIG. 1 and FIG. 2. With reference to FIG. 3, there is shown an electronic UI 300, which may be an example implementation of the electronic UI 110 of FIG. 1. The electronic UI 300 may be displayed on the display device 106 based on a user request, which may be received via an application interface displayed onto a display screen of the display device 106. The application interface may be part of an application software, for example, a software development kit (SDK), a cloud server-based application, a web-based application, an OS-based application/application suite, an enterprise application, a mobile application.

As also discussed, in FIG. 1, the received input may be associated with the software application that uses one or more APIs or the functions provided by the software. The received input may include at least one of the source code of the software application, a portion of the source code which may be associated with the one or more APIs or the functions, or textual information.

On the electronic UI 300, there is shown a set of UI elements, such as a first UI element 302, a second UI element 304, and a third UI element 306. The first UI element 302 may be labelled as, for example, "Upload Source Code". The first UI element 302 may include a browse button 302A. Through the browse button 302A, the user 112 may upload a file that includes the source code of the software application or the portion of the source code which may be associated with the one or more APIs or the functions. The source code of the software application may be written in any programming language and may include information about the one or more APIs or the functions and the first version of the software which provides the one or more APIs or the functions.

In some other embodiments, the user 112 may not want to upload the source code or the portion of the source code of the software application. In such a scenario, the user 112 may provide the input via the second UI element 304. The second UI element 304 may be labelled as, for example, "Enter Details". The second UI element may include an API textbox 304A, a software information textbox 304B, and/or an updated Software information textbox 304C. Through the API textbox 304A, the software information textbox 304B, and/or the updated Software information textbox 304C, the system 102 may receive the textual information associated with the software application. The textual information may include first data associated with one or more APIs or the functions, second data associated with a name of the software that provides the one or more APIs or the functions, and third data associated with the first version of the software.

The API textbox 304A may be a textbox where the user 112 may add information about the name of the one or more APIs or functions that may be used in the first source code of the software application. Through the API textbox 304A, the system 102 may receive the first data of the textual information that may be associated with one or more APIs or the functions.

The software information textbox 304B may allow the user 112 to add information about the software that provides the one or more APIs or functions to the software application. Specifically, the information about the software may include at least a name of the software and a current version (i.e. the first version) of the software. Through the software information textbox 304B, the system 102 may receive the second data and the third data of the textual information. As discussed above, the second data may be associated with the name of the software that provides the one or more APIs or the functions. The third data may be associated with the first version of the software.

The updated Software information textbox 304C may allow the user 112 to add information about an updated version (or the second version) of the software with respect to which the compatibility of the one or more APIs or the functions may have to be determined. It should be noted that the updated Software information textbox 304C may be optional. By default, the system 102 may be configured to select a latest or most recent stable version of the software as the second version of the software.

The third UI element 306 may be labelled as, for example, "Submit" and may be a button. Upon a selection of the button, the system 102 may detect the compatibility of the one or more APIs or the functions used in the first source code with respect to the second version of the software.

It should be noted that the UI/UI elements in the electronic UI 300 are merely provided as an example and should not be construed as limiting for the present disclosure. In some embodiments, the electronic UI 300 may be suitably modified to allow the user 112 to enter or upload more information associated with the software and/or software application.

Figure 4:
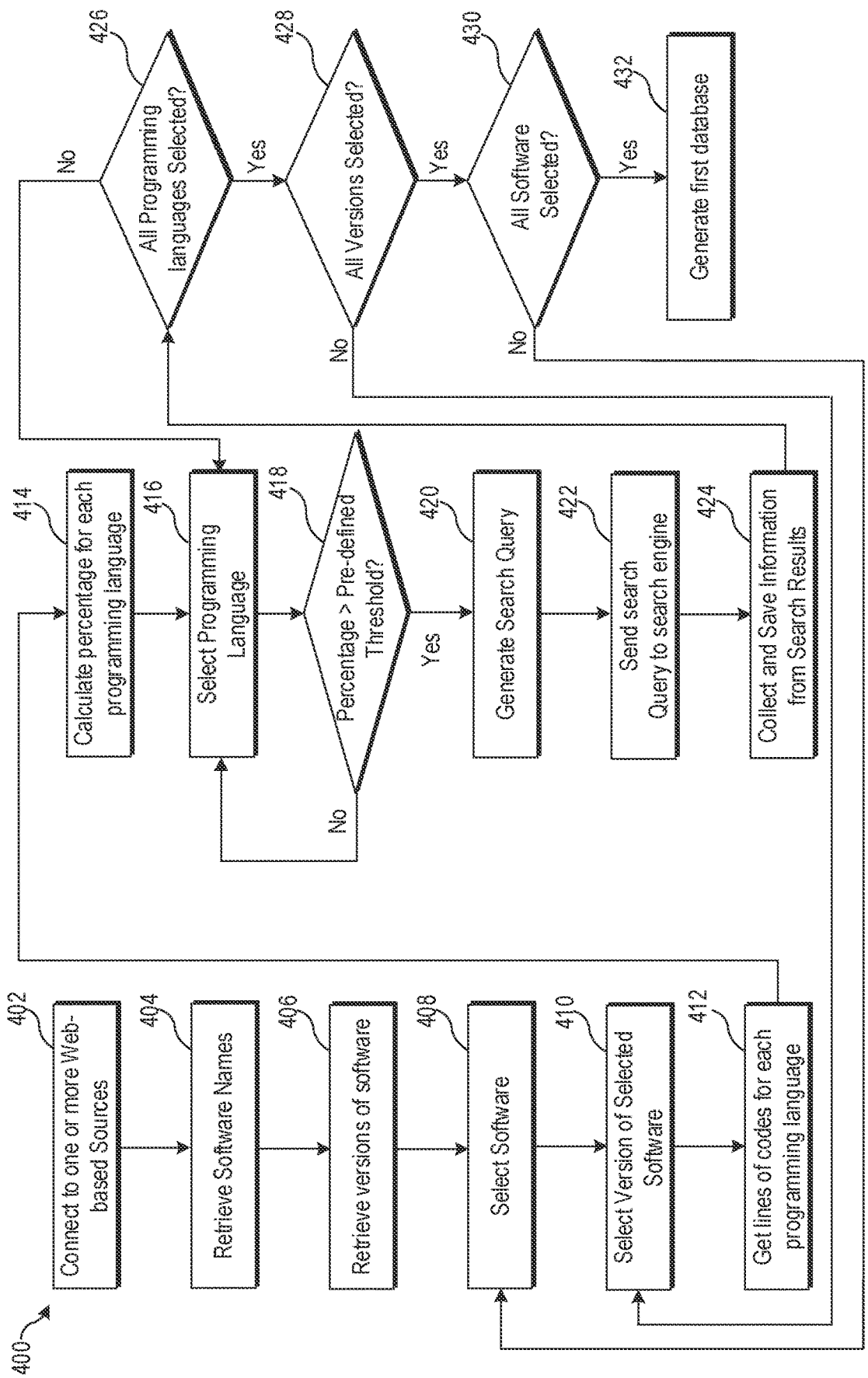
FIG. 4 illustrates a flowchart of an exemplary method for generating a first database that stores software metadata and API metadata associated with the collection of software.

FIG. 4 illustrates a flowchart of an exemplary method for generating a first database that stores software metadata and API metadata associated with the collection of software, according to at least one embodiment described in the present disclosure. FIG. 4 is explained in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the system 102 of FIG. 1 or FIG. 2.

At 402, a connection to the one or more web-based sources 104 may be established. The processor 202 may be configured to establish a connection to the one or more web-based sources 104. The one or more web-based sources 104 may include one or more web-based software hosting sources (e.g. GitHub®), one or more version control system, one or more web-based software metadata storage service, or one or more websites. The processor 202 may be configured to establish the connection between the system 102 and the one or more web-based sources 104 via the communication network 108. The one or more web-based sources 104 may host a collection of software (OSS or FOSS or FLOSS or proprietary) that provides a collection of APIs or functions for development of one or more software applications by users.

At 404, a name of each software in the collection of software may be retrieved. The collection of software may be hosted on the one or more web-based sources 104. The name of each of the collection of software may be retrieved from the one or more web-based sources 104 based on the established connection between the system 102 and the one or more web-based sources 104. In an embodiment, the processor 202 may be configured to transmit a first API request to the one or more web-based sources 104 to retrieve the name of each software in the collection. In an embodiment, the retrieved name of each software may be stored in a first data structure (for example, a first list). By way of example, and not limitation, the software name may be "ABC", "BCD", and "CDE". In an embodiment, the retrieved name of the software may correspond to software metadata associated with the corresponding software.

At 406, one or more versions of each software in the collection of software may be retrieved. The one or more versions may include released versions and unreleased versions of the software that may be available on the one or more web-based sources 104. The released versions of the software may be available to general public, whereas the one or more unreleased versions of the software may be under testing and may be made available to a particular group of people.

In an embodiment, the processor 202 may be configured to transmit a second API request to the one or more web-based sources 104 to retrieve the one or more versions of a corresponding software. The retrieved versions of the software may be stored in a second data structure (say a second list). In an embodiment, the second list may include the name of the software and the corresponding one or more versions. The versions may be represented through a numeric value, an alphabet, a string, or an alphanumeric string. In an embodiment, the retrieved name of the software along with the corresponding one or more versions of the software may correspond to a software metadata associated with the corresponding software.

At 408, a software from the collection of software may be selected. The processor 202 may be configured to select a software based on a listing (e.g., the second list) of the one or more versions of each software. The selected software may be associated with a first entry in the first list. In an embodiment, the processor 202 may be configured to select another software after the control is transferred back to 408 from 430. The new software may be associated with the next entry of the list. With reference to first example, the name of the selected first software may be "ABC".

At 410, a version from the one or more versions of the selected first software may be selected. The version may be selected from the one or more versions which may be associated with the selected software and stored in the second list.

At 412, a count of lines of code in a source code of the selected version of the selected software may be retrieved. The count of lines may be retrieved from the one or more web-based sources 104 via a third API request to one or more web-based sources 104. The code may be written in one or more programming languages, such as Java, C#, C++, Python, JavaScript, and C.

At 414, a percentage of code written in each programming language may be calculated. The percentage of code in a first programming language in the selected version of the selected software may be calculated based on a count of lines of code in the first programming language and a sum of the count of lines of code in all the programming language in the selected version.

In an embodiment, the processor 202 may be configured to store the calculated percentage of code in each programming language in a third data structure (such as a third list). In another embodiment, the system 102 may be configured to receive the calculated percentage of code in each programming language via a fourth API request to the one or more web-based sources 104. With reference to previous example, the calculated percentage of code written in Java, C#, C, C++, Python, and JavaScript may be 45.6%, 16.6%, 11.3%, 5.7%, 7.2%, and 4.1%, respectively. In some embodiments, the metadata associated with selected software may include the name of the selected software, the one or more versions of the selected software, and information about the programming languages used in the one or more versions of each software. The system 102 may be configured to collect the software metadata for each software in the determined collection of software from the one or more web-based sources 104.

At 416, a programming language may be selected. The programming language may be selected based on the percentage of code written in each programming language for the selected version of the selected software.

At 418, it may be determined whether the calculated percentage of the selected programming language is greater than a pre-defined threshold or not. The pre-defined threshold may be a pre-set value. In case the calculated percentage of the selected first programming language is less than the pre-defined threshold, the control may be transferred back to 416 and the selected programming language may be ignored and the API metadata associated with a set of APIs written in the selected programming language may not be determined. In case the calculated percentage of the selected first programming language is greater than the pre-defined threshold, the control may be transferred to 420. For example, if the pre-defined threshold is set to 15%, then the API metadata associated the set of APIs written in the Java and C# programming languages may be determined.

At 420, a search query may be generated. The search query may be generated to search for the set of APIs written in the selected programming language within the selected version of the software. The search query may include the name of the selected software, the selected version of the software, a name of the selected programming language, and a keyword. The keyword may be "API documentation". For example, the generated search query may be "ABC 1.0 Java API Documentation". ABC may be the name of the software, 1.0 may be the version of the software, Java may be the selected programming language, and API documentation may be the keyword.

At 422, the generated search query may be used to execute a search. The processor 202 may be configured to execute the search using the generated search query on the one or more web-based sources 104.

At 424, information may be collected from the search results. The search results may provide an API documentation for the selected version of the selected software. The API documentation may include the name of each API in the set of APIs and a description about each API. In some embodiments, the information collected from the search results may be stored as API metadata associated with the corresponding API.

At 426, it may be determined whether each programming language of the selected version of the selected software has been selected at 416. In case each programming language has been selected at 416, the control may be transferred to 428. Otherwise, the control may be transferred to 416 repeatedly until each programming language has been selected.

At 428, it may be determined whether each of the one or more versions of the selected software has been selected at 410. In case each of the one or more versions of the selected first software has been selected at 410, the control may be transferred to 430. Otherwise, the control may be transferred to 410 until each of the one or more version of the selected software has been selected at 410.

At 430, it may be determined whether each software of the collection of software has been selected at 408. In case each of the collection of software has been selected at 408, the control may be transferred to 432. Otherwise the control may be transferred to 408.

At 432, a first database may be generated. The generate first database may include data associated with each of the collection of software hosted on the one or more web-based sources 104. Specifically, the system 102 may store the collected software metadata and the collected API metadata in the first database. The collected software metadata may include at least one of a name of the software, one or more versions of each software of the determined collection of software, and information about programming languages used in each of the one or more versions of each software. In an embodiment, the system 102 may determine the first information from the generated first database. The first information may be about the one or more APIs or functions used in the source code of the software application (i.e. developer/user application) and the first version of the software which provides the one or more APIs.

In another embodiment, for each software in the collection of software, the data stored in the first database may include a name of the software, one or more versions of the software, one or programming languages (whose calculated percentage is greater than a pre-defined threshold) used in the each version of the software, and a set of APIs available with each version of the software in a specific programming language. By way of example and not limitation, a first table of the generated first database is presented in Table 1 as follows:

TABLE 1

First Table having Software Metadata and API Metadata.

| Software | Version | Programming Language | APIs |
|---|---|---|---|
| ABC | 1.0 | Java | API 1 |
| | | | API 2 |
| | | | API 3 |
| | | C# | API 4 |
| | 1.2 | Java | API 5 |
| BCD | 1.0 | Python | API 6 |
| | | Ruby | API 7 |
| CDE | 1.0 | C++ | API 8 |

Control may pass to end. Although the flowchart 400 is illustrated as discrete operations, such as 402, 404, 406, 408, 410, 412, 414, 416, 418, 420, 422, 424, 426, 428, 430, and 432. However, in certain embodiments, such discrete operations may be further divided into additional operations, combined into fewer operations, or eliminated, depending on the particular implementation without detracting from the essence of the disclosed embodiments.

Figure 5:
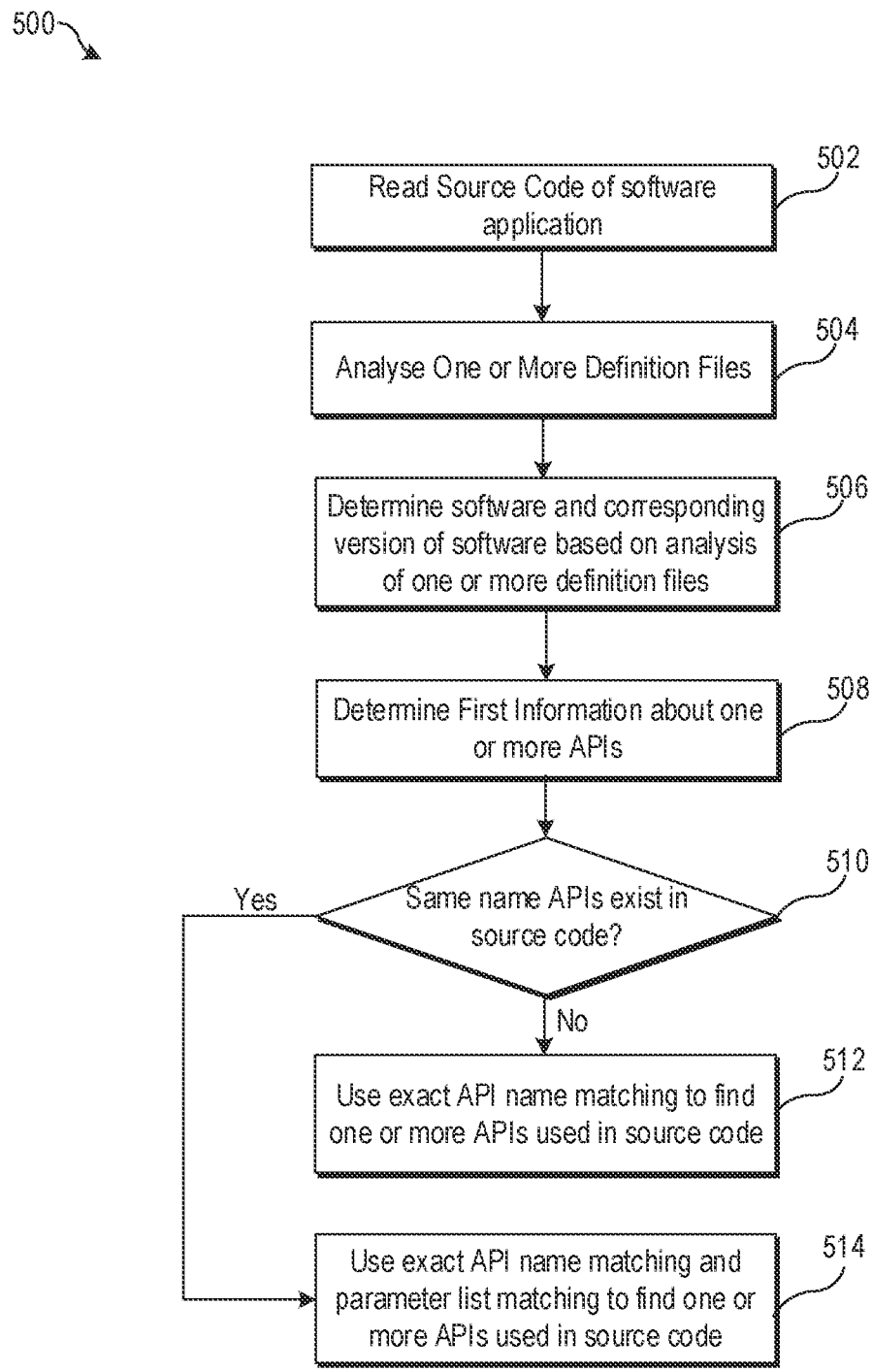
FIG. 5 illustrates a flowchart of an exemplary method for determining the one or more APIs used in the software application from the source code of the software application.

FIG. 5 illustrates a flowchart of an exemplary method for determining the one or more APIs used in the software application from the source code of the software application, according to at least one embodiment described in the present disclosure. FIG. 5 is explained in conjunction with elements from FIG. 1, FIG. 2, FIG. 3, and FIG. 4. With reference to FIG. 5, there is shown a flowchart 500. The method illustrated in the flowchart 500 may start at 502 and may be performed by any suitable system, apparatus, or device, such as by the system 102 of FIG. 1 or FIG. 2.

At 502, the system 102 may be configured to read (or analyze) the source code of the software application included in the received input. The source code of the software application may be read (or analyzed) to determine one or more definition files associated with the source code. In an embodiment, the determined one or more definition files may correspond to artefact files associated with the source code of the software application.

At 504, the one or more definition files may be analyzed. The system 102 may be configured to analyze the one or more definition files associated with read source code. For instance, the artefact file may include of dependencies, binaries resources, use cases, unified modelling language, software documentation, class diagrams, images, risk assessments, and prototypes associated with the source code. In an embodiment, the artefact file may include the received source code of the software application. By way of example, and not limitation, the artefacts file may include a requirements.txt file, a pom.xml file, or a package.json file associated with the source code.

At 506, the software and version information associated with the software may be determined. The system 102 may be configured to determine the software that may provide one or more APIs or functions (for use in the software application) based on the analysis of the one or more definition files. For instance, based on the analysis of the definition files, the system 102 may be configured to determine version information associated with the determined software. The version information may specify a current version (or the first version) of the software used in the source code of the software application.

At 508, the first database may be queried. The system 102 may be configured to query the first database (generated at 432) using the determined version information. The first database may be queried to determine the first information about the one or more APIs or functions, which may be used in the source code of the software application. For example, such information may include the name of the API method or a function that may be called or invoked in the source code of the software application through an API call code or a function definition.

At 510, it may be determined whether the names of the one or more APIs used in the source code of the software application are present in the first database or not. In case the name of the one or more APIs used in the source code of the software application are not present in the first database, the control may be transferred to 512. Otherwise, the control may be transferred to 514.

At 512, the system 102 may be configured to search for each of the set of APIs stored in the first database to determine the one or more APIs used in the source code of the software application. The search may be performed based on the names of the set of APIs stored in the first database. The system 102 may further determine the first information about the one or more APIs or functions which are used in the source code of the software application.

At 514, the system 102 may be configured to search for each of the set of APIs stored in the first database to determine the one or more APIs used in the source code of the software application. The search may be performed based on the names of the set of APIs stored in the first database along with a parameter list associated with the corresponding API. The parameter list may be used to exactly determine the one or more APIs used in the source code as there may exist many APIs with same name but different parameters (method overloading and method overriding). The system 102 may further determine the first information about the one or more APIs or functions used in the source code of the software application. It should be noted that the steps at 510, 512, and 514 are optional and can be skipped.

Control may pass to end. Although the flowchart 500 is illustrated as discrete operations, such as 502, 504, 506, 508, 510, 512, and 514. However, in certain embodiments, such discrete operations may be further divided into additional operations, combined into fewer operations, or eliminated, depending on the particular implementation without detracting from the essence of the disclosed embodiments.

Figure 6:
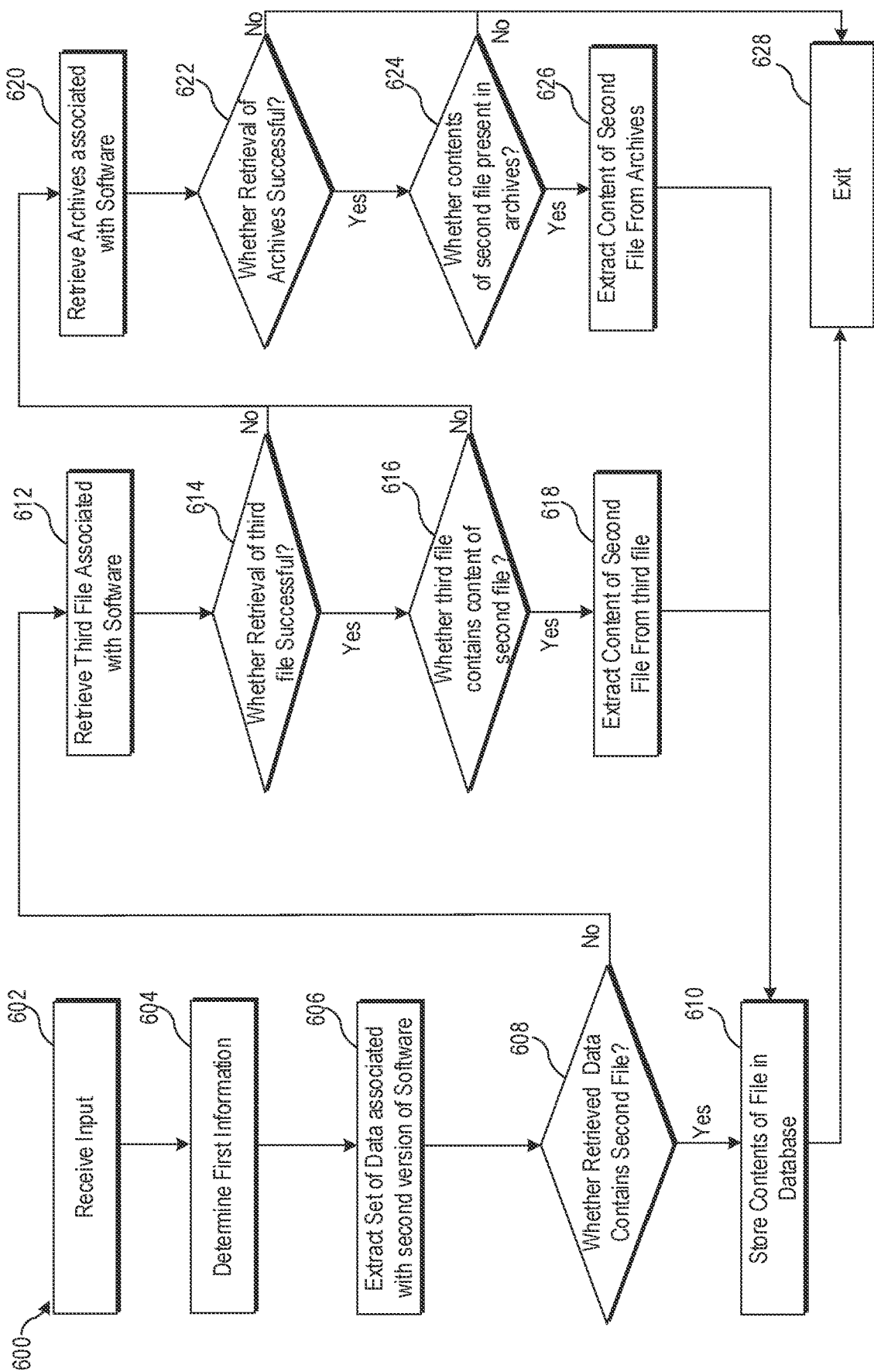
FIG. 6 illustrates a flowchart of an exemplary method for extraction of the contents of a changelog and a readme file associated with a software.

FIG. 6 illustrates a flowchart of an exemplary method for extraction of the contents of a changelog and a readme file associated with a software, according to at least one embodiment described in the present disclosure. FIG. 6 is explained in conjunction with elements from FIG. 1, FIG. 2, FIG. 3, FIG. 4, and FIG. 5. With reference to FIG. 6, there is shown a flowchart 600. The method illustrated in the flowchart 600 may start at 602 and may be performed by any suitable system, apparatus, or device, such as by the system 102 of FIG. 1 or FIG. 2.

At 602, the system 102 may receive the input associated with a software application. The input may include the source code of the software application or a portion of the source code. In an embodiment, the system 102 may receive the name of the software and a first version of the software that provides one or more APIs or functions for use in the source code of the software application. The input may further include the name of the one or more APIs or functions.

At 604, the system 102 may determine first information based on the received input. The first information may be about the one or more APIs or functions used in the source code of the software application. Additionally, the first information may be about the first version of the software which provides the one or more APIs or the functions.

At 606, the system 102 may extract a set of data associated with a second version of the software from the one or more web-based sources 104. The extraction may be performed based on the determined first information. The extracted set of data may include a first file that includes the source code of the second version of the software and/or a second file that includes second information about the one or more changes introduced in the second version with respect to the first version of the software. The second file may correspond to a changelog that includes a curated, chronologically ordered list of notable changes for each version of the software.

At 608, the system 102 may be configured to determine whether the extracted set of data contains the second file. In case the extracted set of data includes the second file, the control may be transferred to 610. Otherwise the control may be transferred to 612.

At 610, the contents of the second file may be stored in a second table of the first database. The contents of the second file may be the second information about the one or more changes introduced in the second version of the software with respect to the first version of the software. Typically, the second file is written by a developer or a contributor. The second file may indicate one or more changes that may make one or more API methods or functions in the second version of the software backward incompatible with that of the first version of the software.

At 612, the system 102 may be configured to retrieve a third file associated with the software (or the second version of the software). The system 102 may retrieve the third file from the one or more web-based sources 104. In some embodiments, the extracted set of data may include the third file. The third file may include a description of the software. Specifically, the third file may correspond to a readme file associated with the software (or the second version of the software). By way of example, and not limitation, content in the third file may include answers to following questions—
1. What is the software used for?
2. Why is the software useful?
3. How to get started with using source code of the software?
4. What are some links or resources to help users with implementing the source code of the software?
5. Who maintains and contributes to the software?
6. What are the one or more changes that are performed in the second version of the software? (optional).

At 614, it may be determined whether the retrieval of the third file is successful or not. In case, the third file is retrieved from the one or more web-based sources 104 or the extracted set of data, the retrieval of the third file may be deemed as successful and the control may be transferred to 616. Otherwise, the control may be transferred to 620.

At 616, it may be determined whether the third file includes the contents of the second file or not. The system 102 may be configured to execute a pattern searching operation to determine whether the contents of the second file is present in the third file or not. Specifically, the pattern searching operation may correspond to a string searching operation that may use regular expressions (regex) to detect one or more tags associated with the compatibility in the extracted set of data. For example, if the one or more first tags correspond to a "changelog", "release notes", "change", or "change log", the regular expression may be "re.search (r'\b(changelog|change log|release notes)\b', readme, re.IGNORECASE)". In case the content of the second file is present in the third file, the control may be transferred to the 618. Otherwise, the control may be transferred to 620.

At 618, the system 102 may be configured to extract the content of the second file from the third file 620. The second content may be associated with the detected one or more tags. The system 102 may be configured to extract the content associated with the one or more tags and store the extracted content in the second table of the first database.

At 620, the system 102 may be configured to retrieve one or more archives of the software. The system 102 may retrieve the one or more archives of the software from the one or more web-based sources 104. In an embodiment, the one or more archives of the software may be retrieved using a second search query. In another embodiment, the system 102 may be configured to implement web-crawlers to retrieve the one or more archives of the software from the one or more web-based sources 104.

Each of the retrieved one or more archives may include a plurality of files associated with the software. Specifically, such archives of the software may correspond to historical records of the software on the one or more web sources 114. The historical records may include a first file (a source code of the software), a second file (i.e. a changelog for the software), a third file (i.e., a readme file for the software), and/or a set of first messages (i.e. commit messages) associated with the software.

At 622, it may be determined whether the retrieval of the one or more archives of the software is successful or not. The one or more archives of the software may correspond to historical records of the corresponding software present on one or more web-based sources 114. The historical records may include the first file (such as source code), the second file (such as a changelog), the third file (such as a readme), and/or the set of first messages (such as a pull request message) associated with a corresponding version of the software. In case the retrieval of the one or more archives is successful, the control may be transferred to 624. Otherwise, it may be deemed that the one or more archives of the software are not present on the one or more web-based sources 104 and the control may be transferred to 628.

At 624, it may be determined whether the one or more archives of the software include the contents of second file or not. In case, the one or more archives of the software contain the contents the second file, the control may be transferred to 626. Otherwise, it may be deemed that the contents of the second file are not present in each of the retrieved one or more archives of the software and the control may be transferred to 628.

At 626, the system 102 may be configured to extract the content of the second file from the one or more archives. The details about the extraction of the second file or the content of the second file from the one or more archives of the software are provided, for example, in FIG. 7.

At 628, the control may pass to end. In some embodiments, the system 102 may be configured to repeat the operations 604 to 626 for each version of the one or more versions of the software and store the contents of the second file, if present, in the first table of the database.

Control may pass to end. Although the flowchart 600 is illustrated as discrete operations, such as 602, 604, 606, 608, 610, 612, 614, 616, 618, 620, 622, 624, 626, and 628. However, in certain embodiments, such discrete operations may be further divided into additional operations, combined into fewer operations, or eliminated, depending on the particular implementation without detracting from the essence of the disclosed embodiments.

Figure 7:
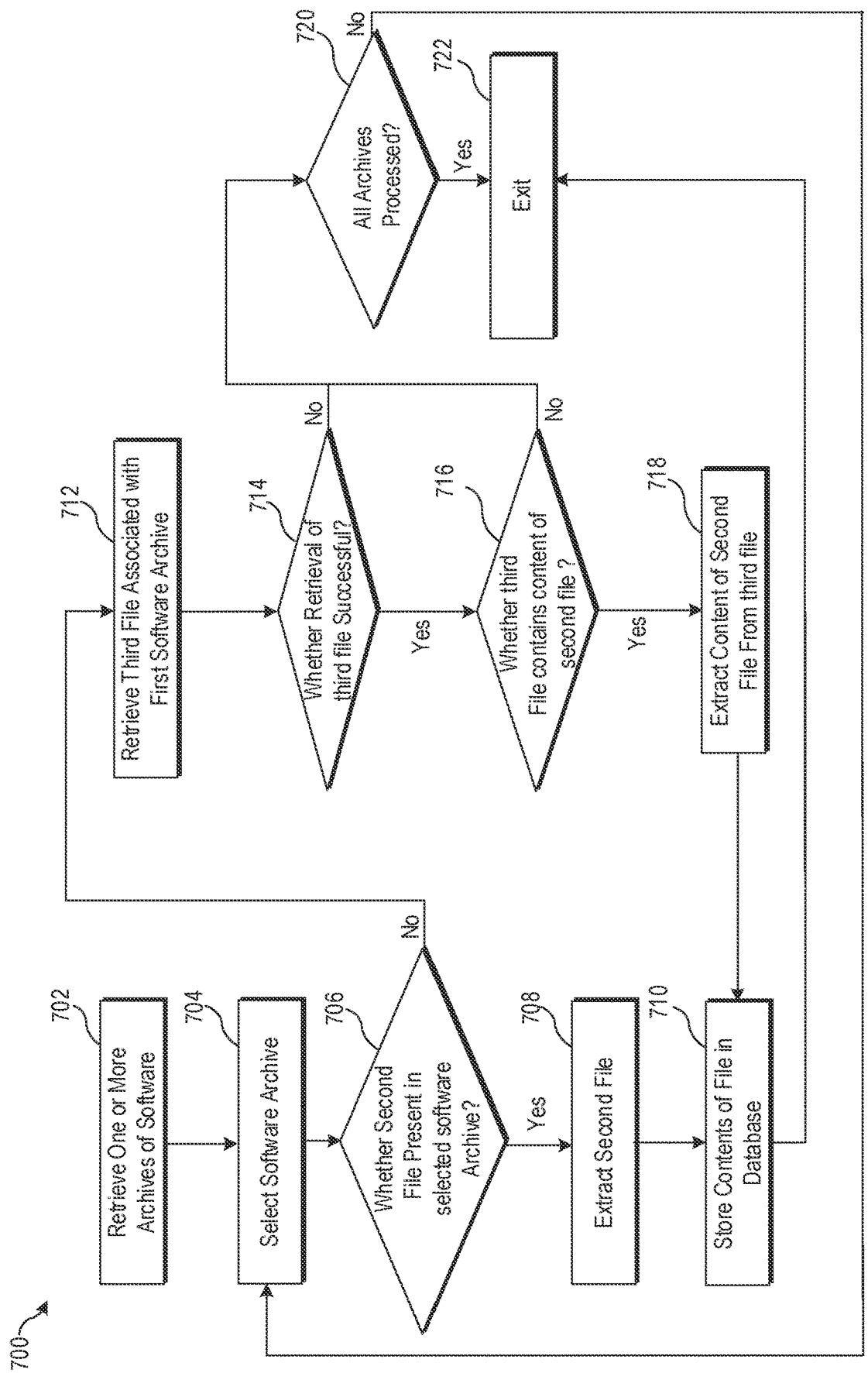
FIG. 7 illustrates a flowchart of an exemplary method for extraction of contents of a changelog.

FIG. 7 illustrates a flowchart of an exemplary method for extraction of contents of a changelog, according to at least one embodiment described in the present disclosure. FIG. 7 is explained in conjunction with elements from FIG. 1, FIG. 2, FIG. 3, FIG. 4, FIG. 5, and FIG. 6. With reference to FIG. 7, there is shown a flowchart 700. The method illustrated in the flowchart 700 may start at 702 and may be performed by any suitable system, apparatus, or device, such as by the system 102 of FIG. 1 or FIG. 2.

At 702, the system 102 may be configured to retrieve the one or more archives of the software. The system 102 may retrieve the one or more archives of the software from the one or more web-based sources 104. In one or more embodiments, the one or more archives of the software may be retrieved using the second search query. Specifically, the system 102 may be configured to search the one or more web-based sources 104 using the second search query. Thereafter, the system 102 may analyse one or more search results obtained based on the search to retrieve the one or more archives of the software.

At 704, the system 102 may be configured to select a software archive from the retrieved one or more archives of the software. In an embodiments, each of the set of archives may be sorted based on an archival date associated with the corresponding archive. The sorted one or more archives may be stored in a data structure (such as a list). The archival date may be associated with a date on which the software was archived. The selected archive may be present in at the beginning of the data structure that stores the sorted archives. In an embodiment, the system 102 may be further configured to decompress the selected archive (if required).

In some embodiments, the control may be transferred back to 704 from 720. In such a scenario, the system 102 may select a next software archive from the list in a sequential manner.

At 706, it may be determined whether the second file is present in the selected first archive. In case the second file is present in the selected archive (or the decompressed archive), the control may be transferred to 708. Otherwise, the control may be transferred to 712.

At 708, the system 102 may be configured to extract the second file from the selected archive or the decompressed selected archive. The second file may have a unique name. The system 102 may analyze the names of each file to extract the second file. In an embodiment, the system 102 may use regular expressions to search the second file from the plurality of files. For example, the regular expression to search the second file may be "re.search(r'\A(change log-|news|change|changelog) (\.md|\.markdown|\.txt|\.html)?\Z', files, re.IGNORECASE)".

At 710, the contents of the second file may be stored in the second table of the database. The contents of the second file may include the second information about the one or more changes in the first archived version of the software with respect to the first version of the software.

At 712, the system 102 may be configured to retrieve the third file associated with the selected software archive. In some embodiments, the system 102 may extract the third file from the plurality of files in the decompressed selected archive or the selected archive.

At 714, it may be determined whether the retrieval of the third file is successful or not. In case the third file is retrieved from the plurality of files, the retrieval of the third file may be deemed as successful and the control may be transferred to 716. Otherwise, the control may be transferred to 720.

At 716, it may be determined whether the third file includes the contents of the second file or not. The details about the determination of the presence of the contents of the second file in the retrieved third file are provided, for example, in FIG. 6. In case the content of the second file is present in the third file, the control may be transferred to the 718. Otherwise, the control may be transferred to 720.

At 718, the system 102 may be configured to extract the content of the second file from the third file 620. The system 102 may be further configured to store the extracted contents of the second file in the second table of the first database, as discussed at 710.

At 720, it may be determined whether each of the one or more archives have been processed. The processing of an archive may correspond to the execution of operations from 706 to 718. In case each archive has been processed, the control may pass to 722. Otherwise, the control may be transferred back to 704.

At 722, the control may pass to end.

Control may pass to end. Although the flowchart 700 is illustrated as discrete operations, such as 702, 704, 706, 708, 710, 712, 714, 716, 718, 720, and 722. However, in certain embodiments, such discrete operations may be further divided into additional operations, combined into fewer operations, or eliminated, depending on the particular implementation without detracting from the essence of the disclosed embodiments.

Figure 8:
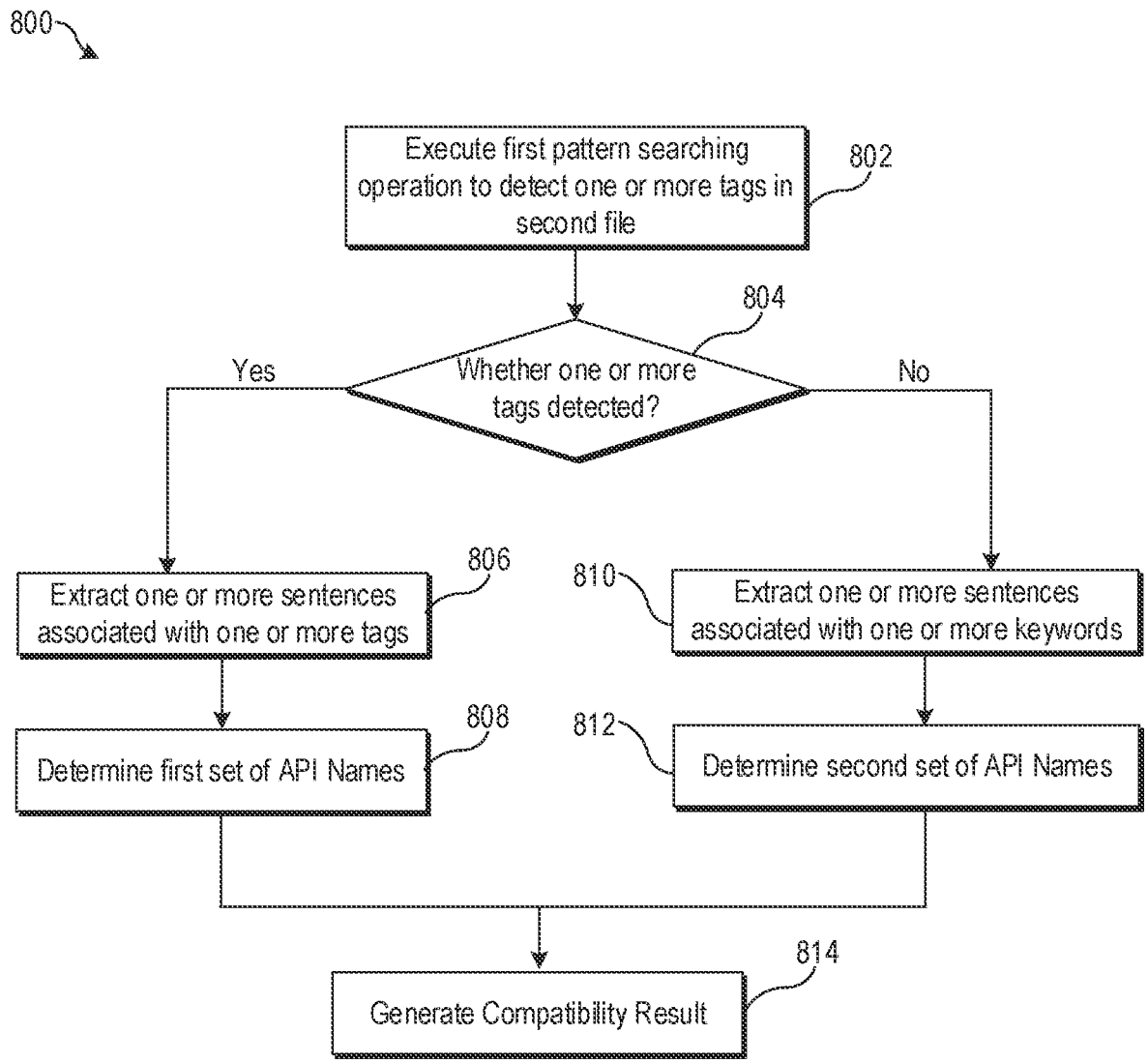
FIG. 8 illustrates a flowchart of an exemplary method for generation of compatibility result.

FIG. 8 illustrates a flowchart of an exemplary method for generation of compatibility result, according to at least one embodiment described in the present disclosure. FIG. 8 is explained in conjunction with elements from FIG. 1, FIG. 2, FIG. 3, FIG. 4, FIG. 5, FIG. 6, and FIG. 7. With reference to FIG. 8, there is shown a flowchart 800. The method illustrated in the flowchart 800 may start at 802 and may be performed by any suitable system, apparatus, or device, such as by the system 102 of FIG. 1 or FIG. 2.

At 802, the system 102 may be configured to execute a first pattern searching operation of the set of operations on the extracted set of data (for example, extracted in FIG. 6). Specifically, the system 102 may be configured to execute the first pattern searching operation on the content of the second file (i.e. a changelog present in the extracted set of data) to detect one or more tags associated with the compatibility. The first pattern searching operation may be a string searching operation that may use one or more regular expressions to detect the one or more tags associated with the compatibility. By way of example, and not limitation, the one or more tags may include "breaking", "break", "incompatible", "breaking change" and the like.

At 804, it may be determined whether the one or more tags are detected in the content of the second file or not. In case the one or more tags are detected in the content of the second file, the control may be transferred to 806. Otherwise, the control may be transferred to 810.

At 806, the system 102 may be configured to extract one or more sentences associated with the detected one or more tags. The detected one or more sentences may include the detected one or more tags.

At 808, the system 102 may be configured to determine a first set of API names or function names mentioned in the extracted one or more sentences. The first set of API names or function names may be mentioned in the extracted one or more sentences along with the detected one or more tags.

At 810, the system 102 may be configured to extract one or more sentences associated with one or more keywords. The one or more keywords may be semantically similar to the one or more tags. By way of example, the one or more keywords may be "compatible", "breaking", "break", "incompatible", "breaking change" and the like. The system 102 may be configured to execute a pattern searching operation to detect the one or more keywords in the contents of the second file. The detected one or more sentences may include the detected one or more keywords.

At 812, the system 102 may be configured to determine a second set of API names or function names mentioned in the extracted one or more sentences. Each of the one or more sentences may include the one or more keywords and at least one API name of the second set of API names.

At 814, the compatibility result may be generated. To generate the compatibility result, the system 102 may be configured to determine whether the determined first set of API names or the function names and/or the determined second set of API names or the function names include names of the one or more APIs or the functions used in the source code of the software application. The compatibility result may be generated based on the determination that the determined first set of API names or the function names and/or the determined second set of API names or the function names include the names of the APIs or the functions used in the source code of the software application.

As an example, if the determined tags and the keywords (e.g. incompatible, breaking, and the like) indicate a breaking compatibility and the determined API names or the function names include names of the APIs or the functions used in the source code of the software application, then the compatibility result may indicate an incompatibility of the APIs or the functions used in the source code of the software application with respect to the second version of the software. If the determined tags and the keywords (e.g. compatible, consistent, and the like) indicate that the compatibility still holds and the determined API names or the function names include names of the APIs or the functions used in the source code of the software application, then the compatibility result may indicate the APIs or the functions used in the source code of the software application are compatible with respect to the second version of the software.

Control may pass to end. Although the flowchart 800 is illustrated as discrete operations, such as 802, 804, 806, 808, 810, 812, and 814. However, in certain embodiments, such discrete operations may be further divided into additional operations, combined into fewer operations, or eliminated, depending on the particular implementation without detracting from the essence of the disclosed embodiments.

Figure 9:
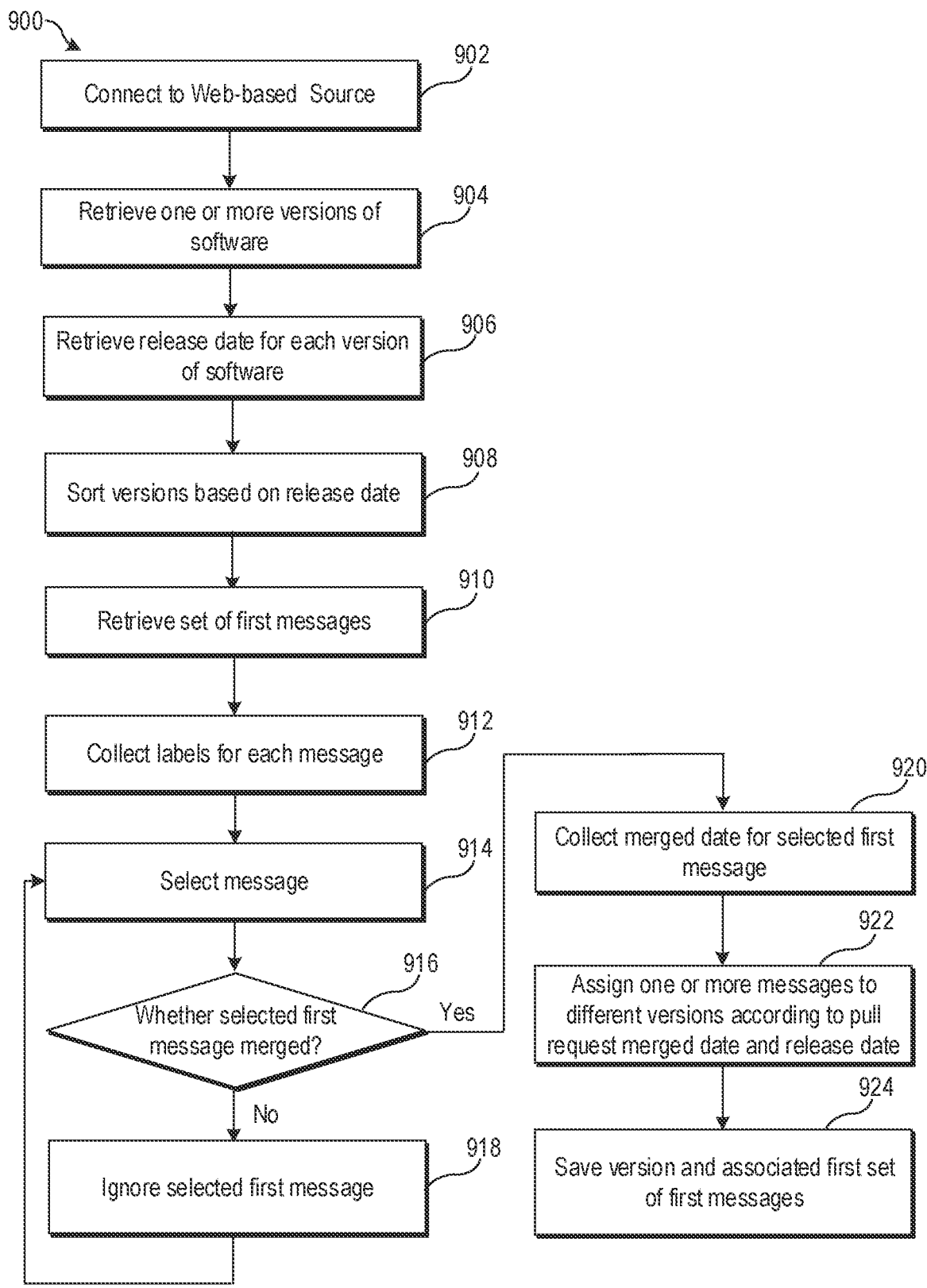
FIG. 9 illustrates a flowchart of an exemplary method for extraction of a set of first messages associated with the one or more versions of a software.

FIG. 9 illustrates a flowchart of an exemplary method for extraction of a set of first messages associated with the one or more versions of a software, according to at least one embodiment described in the present disclosure. FIG. 9 is explained in conjunction with elements from FIG. 1, FIG. 2, FIG. 3, FIG. 4, FIG. 5, FIG. 6, FIG. 7, and FIG. 8. With reference to FIG. 9, there is shown a flowchart 900. The method illustrated in the flowchart 900 may start at 902 and may be performed by any suitable system, apparatus, or device, such as by the system 102 of FIG. 1 or FIG. 2.

At 902, a connection to the one or more web-based sources 104 may be established. The processor 202 may be configured to establish a connection to the one or more web-based sources 104 via the communication network 108.

At 904, the system 102 may be configured to retrieve one or more versions of the software which provides the one or more APIs or the functions for the software application. The system 102 may be configured to transmit an API request to the one or more web-based sources 104 to retrieve the one or more versions of the software.

At 906, the system 102 may be configured to retrieve a release date associated with each of the retrieved one or more versions of the software. The release date may be a date on which the corresponding version of the software may be available to the public for usage, testing, or review.

At 908, the system 102 may be configured to sort the one or more versions of the software based on the retrieved release date of the corresponding version of the software. In an embodiment, the system 102 may be configured to sort the one or more versions of the software in an ascending order. In another embodiment, the system 102 may be configured to sort the one or more versions of the software in a descending order.

At 910, the system 102 may be configured to retrieve a set of first messages associated with the software, from the one or more web-based sources 104. Specifically, the set of first messages may be associated with one or more changes introduced in the source code of a version of the software. For example, on GitHub®), each of the set of first messages may correspond to a pull request message.

At 912, the system 102 may be configured to collect one or more labels in each of the retrieved set of first messages. Such labels may be collected to determine whether or not the one or more changes introduced in the source code of a specific version of the software have been merged with a corresponding version of the code hosted on the one or more web-based sources 104. The one or more labels may include, for example, a value for "merged_at" key and "merge_commit_sha" key. The system 102 may be configured to consider messages that have the value for "merged_at" key and "merge_commit_sha" key.

At 914, the system 102 may be configured to select a message from the set of first messages. The set of first messages may be associated with one or more changes introduced in the source code of a specific version of the software.

At 916, it may be determined whether the selected message is merged with the specific version of the software. Specifically, the system 102 may be configured to determine whether the selected message has values for the "merged_at" key and the "merge_commit_sha" key. In case the selected message does not have values for the "merged_at" key and the "merge_commit_sha" key, it may imply that the selected message has not been merged with the corresponding version of the software and thus the control may be transferred to 918. Otherwise, the control may be transferred to 920.

At 918, the system 102 may be configured to ignore the selected first message and transfer back the control to 914. At 914, a new message may be selected from the set of first messages.

At 920, the system 102 may be configured to collect the merged date of the first message with the specific version of the software. The merged date may correspond to a date when the first message is associated with the specific version of the software. The merged date may correspond to the value of the "merged_key".

At 922, the system 102 may be configured to assign the selected message to a specific version of the software, according to the merged date and a release date of the version of the software.

At 924, the system 102 may be configured to save the corresponding version of the software along with the one or more messages of the set of first messages in a third table of the first database. The system 102 may be configured to determine the one or more messages from the first set of first messages associated with the corresponding version, based on a merged date of the corresponding message and save the corresponding version of the software along with the one or more messages of the set of first messages in a third table of the first database.

Control may pass to end. Although the flowchart 900 is illustrated as discrete operations, such as 902, 904, 906, 908, 910, 912, 914, 916, 918, 920, 922, and 924. However, in certain embodiments, such discrete operations may be further divided into additional operations, combined into fewer operations, or eliminated, depending on the particular implementation without detracting from the essence of the disclosed embodiments.

Figure 10:
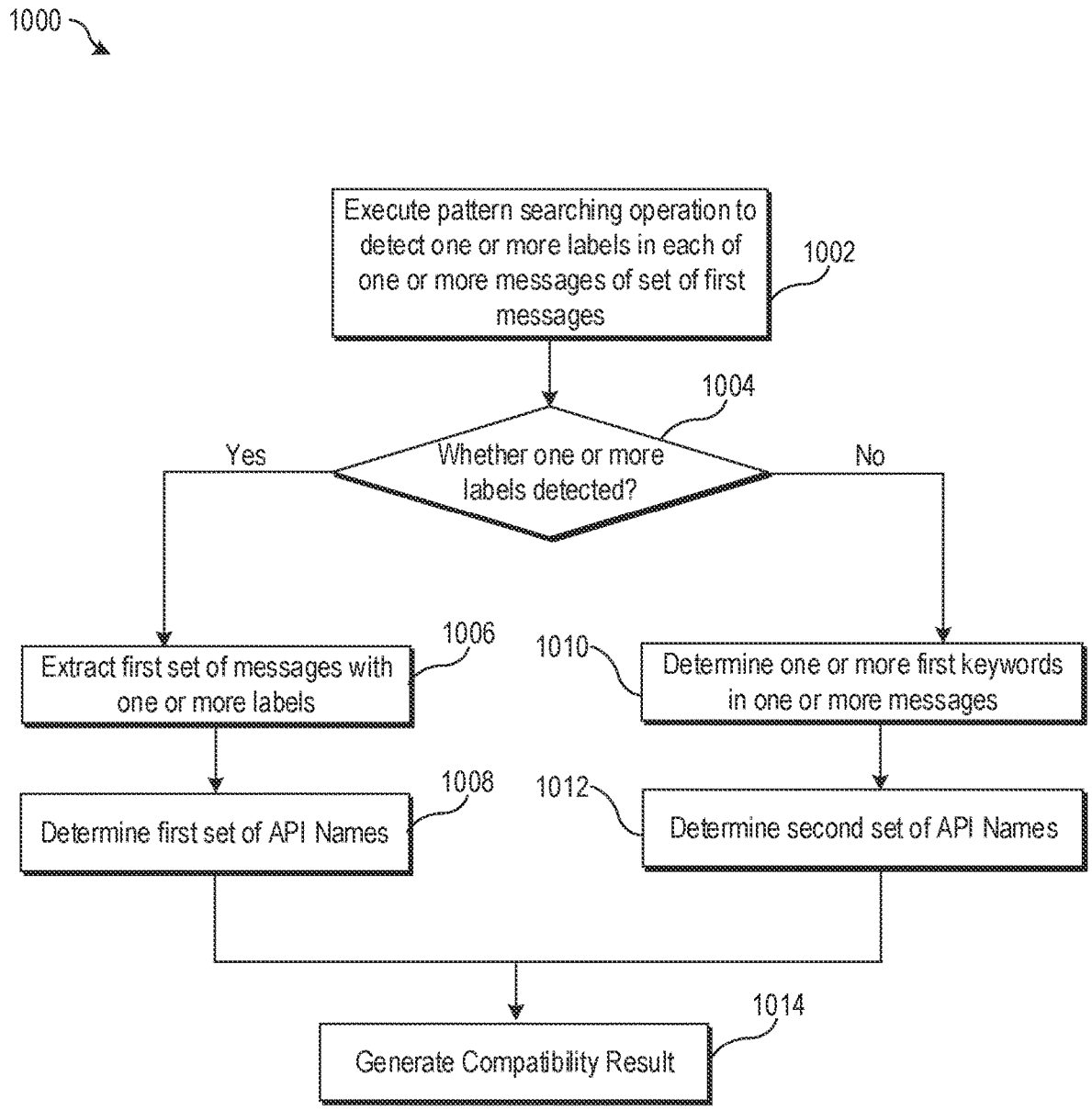
FIG. 10 illustrates a flowchart of an exemplary method for generation of a compatibility result based on messages associated with versions of a software.

FIG. 10 illustrates a flowchart of an exemplary method for generation of a compatibility result based on messages associated with versions of a software, according to at least one embodiment described in the present disclosure. FIG. 10 is explained in conjunction with elements from FIG. 1, FIG. 2, FIG. 3, FIG. 4, FIG. 5, FIG. 6, FIG. 7, FIG. 8, and FIG. 9. With reference to FIG. 10, there is shown a flowchart 1000. The method illustrated in the flowchart 1000 may start at 1002 and may be performed by any suitable system, apparatus, or device, such as by the system 102 of FIG. 1 or FIG. 2.

At 1002, the system 102 may be configured to execute a pattern searching operation (of a set of operations) on each of the one or more messages of the set of first messages (included in the extracted set of data). The one or more messages may be associated with the second version of the software. The pattern searching operation may be executed to detect one or more labels in the set of first messages. Similar to the first pattern searching operation, the pattern searching operation may be a string searching operation that may use one or more regular expressions to detect the one or more labels associated with compatibility in the messages. Such labels may include words, such as "breaking", "break", "incompatible", and "breaking change".

At 1004, it may be determined whether the one or more labels are detected in one or more messages of the set of first messages. In case the one or more labels are detected, the control may be transferred to 1006. Otherwise, the control may be transferred to 1010.

At 1006, the system 102 may be configured to extract a first set of messages from the one or more messages. The extracted first set of messages may be associated with the detected one or more labels. Specifically, the extracted first set of messages may include the one or more labels. The one or more messages may indicate an incompatibility of the second version of the software. An example of a message of the first set of messages may be "Breaking Change: Software can be executed by disabling environment variable A".

At 1008, the system 102 may be configured to determine a first set of API names or function names mentioned in the extracted first set of messages. The first set of API names or function names may be mentioned in the extracted first set of messages along with the detected one or more labels.

At 1010, the system 102 may be configured to determine one or more first keywords in the one or more messages. The one or more first keywords may be semantically similar to the one or more labels. Such Keywords may include words, such as "compatibility changes", "stop", "interrupt", "conflict" and the like. In some embodiments, the system 102 may be configured to execute a fourth pattern searching operation to detect the one or more first keywords in the one or more messages. The system 102 may be configured to extract a second set of messages that may include the one or more first keywords.

At 1012, the system 102 may be configured to determine a second set of API names or function names mentioned in the extracted second set of messages. Each of the extracted second set of messages may include the one or more first keywords and at least one API name of the second set of API names.

At 1014, the compatibility result may be generated. To generate the compatibility result, the system 102 may be configured to determine whether or not the determined first set of API names or the function names and/or the determined second set of API names or the function names include names of the one or more APIs or the functions used in the source code of the software application. The compatibility result may be generated based on the determination that the determined first set of API names or the function names and/or the determined second set of API names or the function names include the names of the one or more APIs or the functions used in the source code of the software application.

As an example, if the determined tags and the keywords (e.g. incompatible, breaking, and the like) indicate a breaking compatibility and the determined first set of API names or the function names or the determined second set of API names or the function names include names of the one or more APIs or the functions used in the source code of the software application, then the compatibility result may indicate an incompatibility of the one or more APIs or the functions used in the source code of the software application with respect to the second version of the software. Otherwise, if the determined tags and the keywords (e.g. compatible, consistent, and the like) indicate that the compatibility holds and the determined first set of API names or the function names and/or the determined second set of API names or the function names include names of the one or more APIs or the functions used in the source code of the software application, then the compatibility result may indicate the one or more APIs or the functions used in the source code of the software application are compatible with respect to the second version of the software.

Control may pass to end. Although the flowchart 1000 is illustrated as discrete operations, such as 1002, 1004, 1006, 1008, 1010, 1012, and 1014. However, in certain embodiments, such discrete operations may be further divided into additional operations, combined into fewer operations, or eliminated, depending on the particular implementation without detracting from the essence of the disclosed embodiments.

Figure 11:
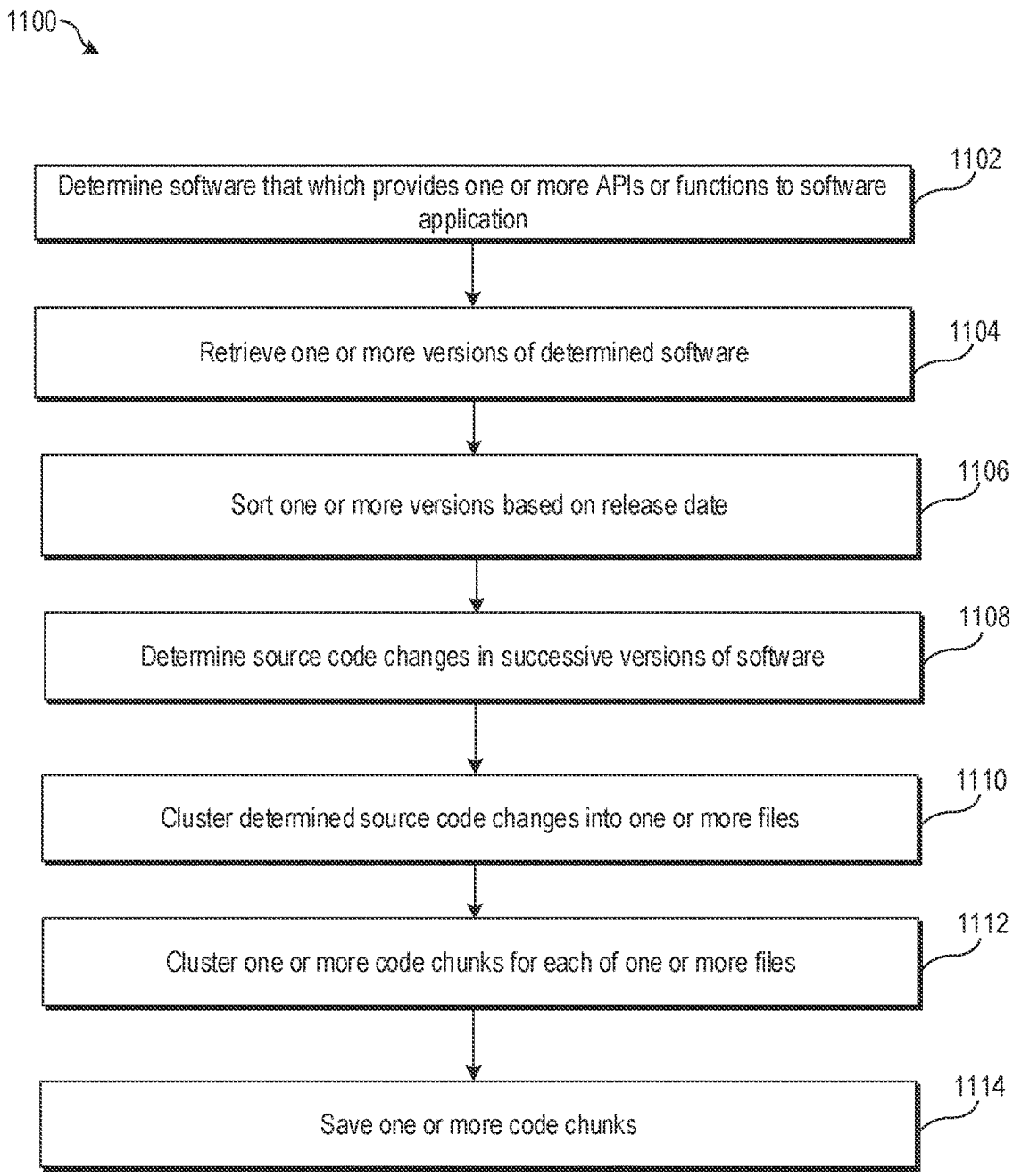
FIG. 11 illustrates a flowchart of an exemplary method for extraction of a file that includes a source code of a second version of a software.

FIG. 11 illustrates a flowchart of an exemplary method for extraction of a file that includes a source code of a second version of a software, according to at least one embodiment described in the present disclosure. FIG. 11 is explained in conjunction with elements from FIG. 1, FIG. 2, FIG. 3, FIG. 4, FIG. 5, FIG. 6, FIG. 7, FIG. 8, FIG. 9, and FIG. 10. With reference to FIG. 11, there is shown a flowchart 1100. The method illustrated in the flowchart 1100 may start at 1102 and may be performed by any suitable system, apparatus, or device, such as by the system 102 of FIG. 1 or FIG. 2.

At 1102, the system 102 may be configured to determine the software that provides the one or more APIs or the functions for the software application (associated with the user 112). The system 102 may determine the software based on the received input associated with the software application.

At 1104, the system 102 may be configured to retrieve one or more versions of the determined software. The system 102 may be configured to retrieve the one or more versions of the determined software from the one or more web-based sources 104 of from the first table of the generated first database.

At 1106, the system 102 may be configured to sort each of the one or more versions of the determined software. In one or more embodiments, the system 102 may be configured to sort each of the one or more versions of the determined software based on a release date associated with each version of the one or more versions of the determined software. In an embodiment, the system 102 may be configured to sort the one or more versions of the software in the ascending order of the release dates. In another embodiment, the system 102 may be configured to sort the one or more versions of the software in the descending order of the release dates.

At 1108, the system 102 may be configured to determine changes in the source code between two successive versions of the determined software. For example, the successive versions may include the first version (v1.0) of the software and the second version (v2.0) of the software. The second version may be released just after the first version and there may be no intermediate version of the software between the first version of the software and the second version of the software.

In an embodiment, the system 102 may be configured to parse and analyze information associated with each version of the software to determine changes in the source code of each neighboring version pair of the determined software.

At 1110, the system 102 may be configured to cluster determined changes in the source code into one or more files. Each of these one or more files that contain the determined changes in the source code may correspond to a first file.

At 1112, the system 102 may be configured to cluster one or more code chunks in each of the one or more files. Each code chunk may correspond to a modified block of source code in the second version of the software. The modification introduced in the second version may be with respect to the source code of the first version of the software. More specifically, each code chunk may correspond to one or more changes introduced in the source code of the second version of the software with respect to a source code of the first version of the software.

At 1114, the system 102 may be configured to store each of the one or more code chunks in the memory of the system 102. In some embodiments, the system 102 may be configured to store each of the one or more code chunks in a data structure for further processing, The system 102 may use the stored one or more code chunks for determination of the compatibility (or backward compatibility) of the one or more APIs or the functions (used in the source code of the software application (associated with the user 112)), with respect to the second version of the software. In some embodiments, the system 102 may be configured to store each of the one or more code chunks in the generated first database.

Control may pass to end. Although the flowchart 1100 is illustrated as discrete operations, such as 1102, 1104, 1106, 1108, 1110, 1112, and 1114. However, in certain embodiments, such discrete operations may be further divided into additional operations, combined into fewer operations, or eliminated, depending on the particular implementation without detracting from the essence of the disclosed embodiments.

In an embodiment, a set of second messages may include the one or more changes that may be introduced in the source code of the second version of the software. Each of the set of second messages may be written by a developer or contributor, about one or more changes that the developer or the contributor may have incorporated in the second version of the software. For example, each of the set of second messages may correspond to a commit message on GitHub®.

In such a scenario, the system 102 may be configured to execute the operations described in FIG. 11 to collect one or more code chunks from the set of second messages. Such code chunks may correspond to the one or more changes introduced in the source code of the second version of the software with respect to the source code of the first version of the software. The system 102 may be configured to use one or more regular expressions to detect such changes in the source code.

Figure 12:
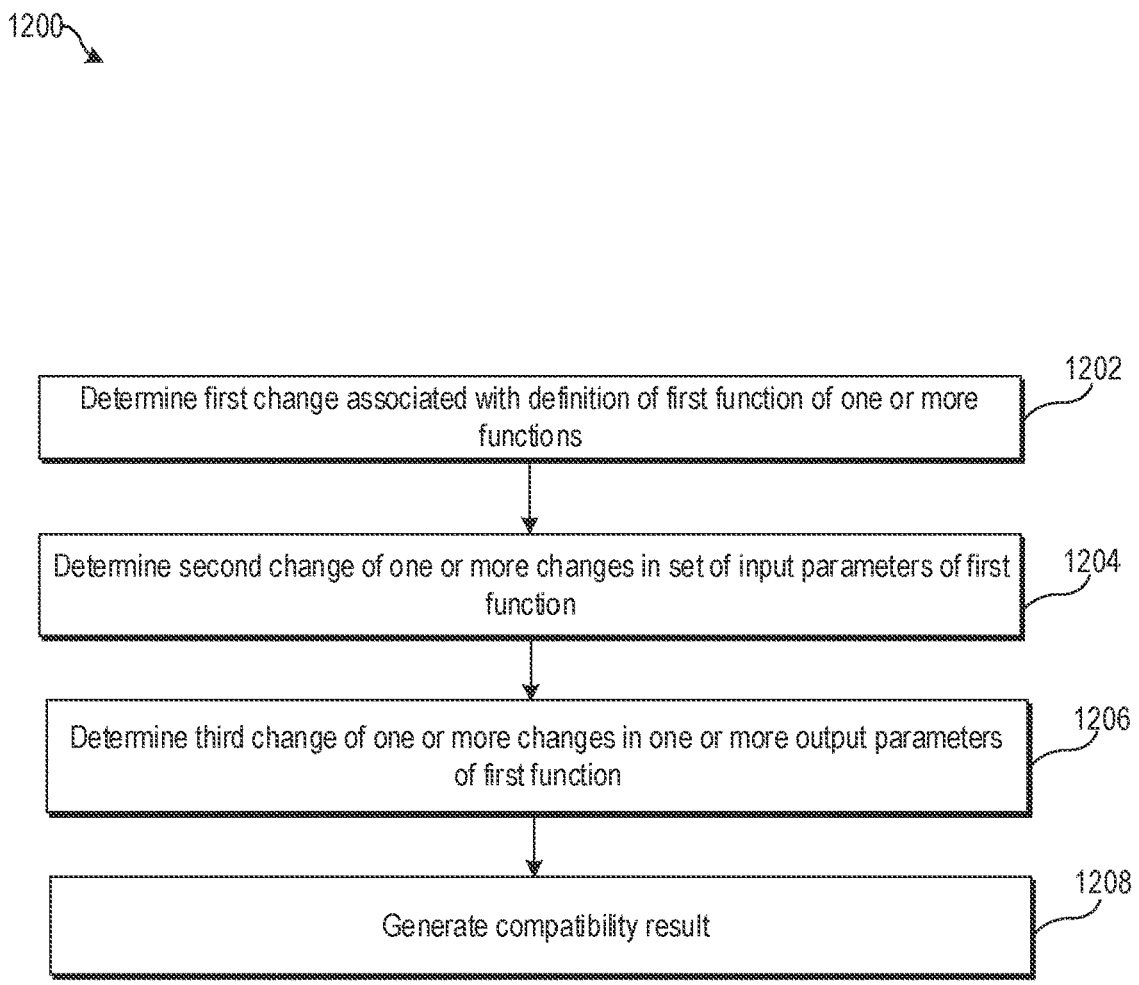
FIG. 12 illustrates a flowchart of an exemplary method for generation of compatibility result based on collected one or more code chunks.

FIG. 12 illustrates a flowchart of an exemplary method for generation of compatibility result based on collected one or more code chunks, according to at least one embodiment described in the present disclosure. FIG. 12 is explained in conjunction with elements from FIG. 1, FIG. 2, FIG. 3, FIG. 4, FIG. 5, FIG. 6, FIG. 7, FIG. 8, FIG. 9, FIG. 10, and FIG. 11. With reference to FIG. 12, there is shown a flowchart 1200. The method illustrated in the flowchart 1200 may start at 1202 and may be performed by any suitable system, apparatus, or device, such as by the system 102 of FIG. 1 or FIG. 2.

The system 102 may collect, from the extracted set of data (as described in FIG. 1 and FIG. 6), one or more code chunks which corresponds to the one or more changes in the source code of the second version of the software with respect to a source code of the first version of the software. Thereafter, the system 102 may executing a second pattern searching operation of a set of operations on the one or more code chunks to generate a compatibility result. The second pattern searching operation may be executed to determine a set of changes, as described herein.

At 1202, the system 102 may be configured to determine a first change change associated with a definition of a first function of one or more functions in the second version of the software. The first change may be determined with respect to the first version of the software. The one or more functions may be provided by the software, for use in the source code of the software application. In some instances, such functions may be used in the source code of the software application. For example, the source code of the software application may include an API call code, which when executed, sends an API call to a server that executes the function based on parameters in the API call. The first change in the definition may break backward compatibility, if the source code of the software application uses a definition from the first version of the software. The details about the determination of the first change are provided for example in FIG. 14.

At 1204, the system 102 may be configured to determine a second change of the one or more changes in a set of input parameters of the first function. The change may be determined in the second version of the software, with respect to the first version of the software. The second change in the set of input parameters may break backward compatibility, if the source code of the software application uses the set of inputs parameters from the first version of the software. The details about the determination of the second change are provided, for example in FIG. 15.

At 1206, the system 102 may be configured to determine a third change change of the one or more changes in one or more output parameters of the first function. The third change may be determined in the second version of the software, with respect to the first version of the software. The third change in the set of output parameters may break backward compatibility, if the source code of the software application uses the set of output parameters from the first version of the software. The details about the determination of the first change are provided for example in FIG. 16.

At 1208, the system 102 may be configured to generate a compatibility result. The compatibility result may include changes in one or more of a definition of the first function of the one or more functions or a first API of the one or more APIs, the one or more input parameters associated with the first function or the first API, and one or more output parameters associated with the first function or the first API.

Control may pass to end. Although the flowchart 1200 is illustrated as discrete operations, such as 1202, 1204, 1206, and 1208. However, in certain embodiments, such discrete operations may be further divided into additional operations, combined into fewer operations, or eliminated, depending on the particular implementation without detracting from the essence of the disclosed embodiments.

Figure 13:
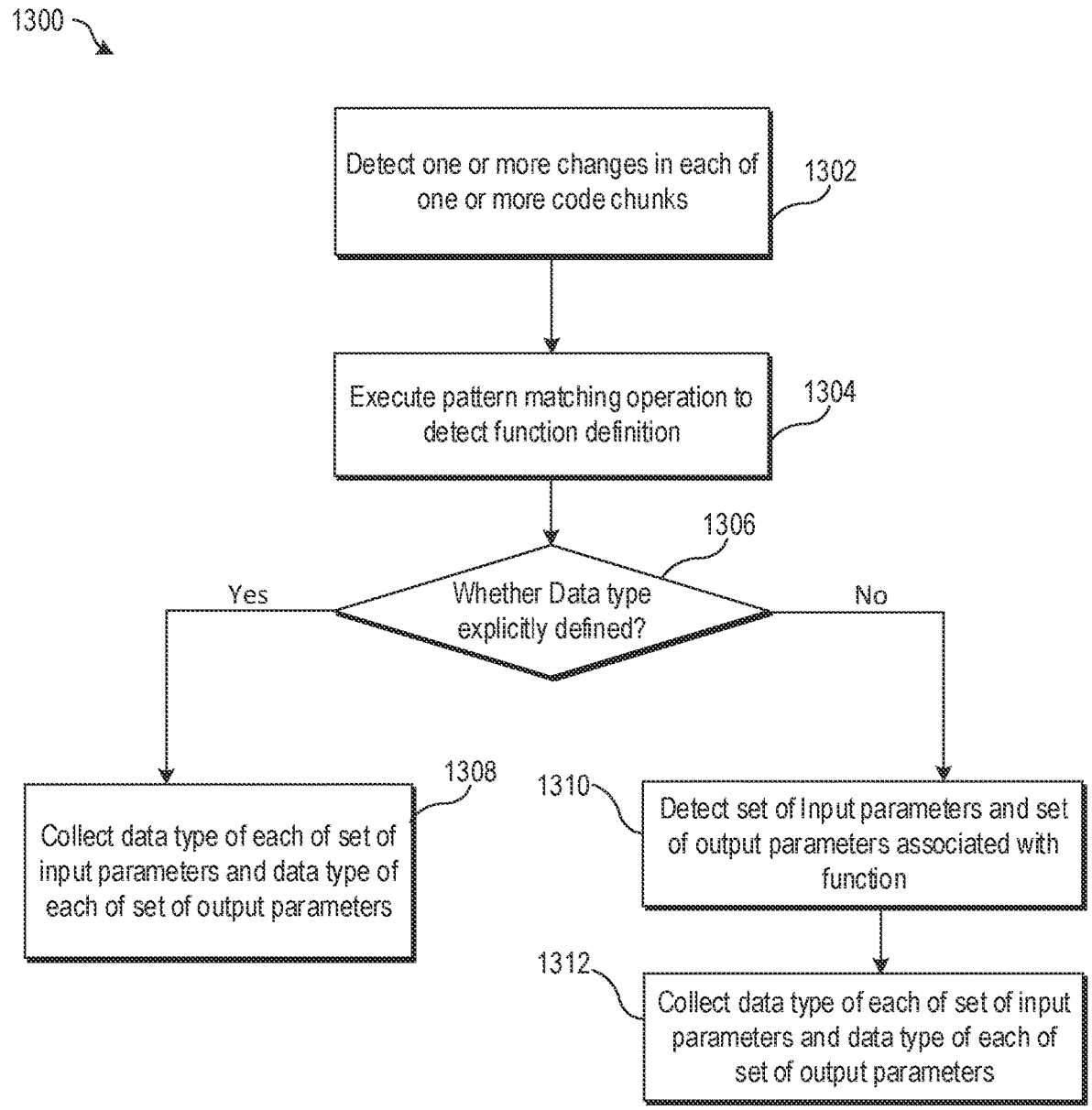
FIG. 13 illustrates a flowchart of an exemplary method for a detection of a function definition.

FIG. 13 illustrates a flowchart of an exemplary method for a detection of a function definition, according to at least one embodiment described in the present disclosure. FIG. 13 is explained in conjunction with elements from FIG. 1, FIG. 2, FIG. 3, FIG. 4, FIG. 5, FIG. 6, FIG. 7, FIG. 8, FIG. 9, FIG. 10, FIG. 11, and FIG. 12. With reference to FIG. 13, there is shown a flowchart 1300. The method illustrated in the flowchart 1300 may start at 1302 and may be performed by any suitable system, apparatus, or device, such as by the system 102 of FIG. 1 or FIG. 2.

Each programming language may have its own syntax that may have to be handled in the code. For example, a syntax for a function definition in Python may be "def f(para1, para2, . . . ):", a syntax for a function definition in C/C++ may be "typ0 f(typ1 para1, typ2 para2, . . . ) { . . . }", and a syntax for a function definition in JavaScript may be "function f(para1, para2) { . . . }".

At 1302, the system 102 may be configured to detect one or more changes in each of the one or more code chunks. Specifically, the system 102 may be configured to detect one or more changes in the source code of the second version of the software with respect to the source code of the first version of the software. In an embodiment, the one or more changes may be associated with special characters. For example, a '+' special character may be appended before every line that may be added in the source code of the second version of the software. Similarly, a '−' special character may be added before every line that may be present in the first version of the software but absent in the second version of the software. In such an embodiment, the system 102 may be configured to detect the special characters that may lead to detection of the one or more one or more changes in each of the one or more code chunks.

In some other embodiments, the number of lines added in the second version of the source code and a number of lines deleted in the second version of the source code may be present in a header section of the source code of the second version of the software. The system 102 may use one or more regular expressions to detect the special characters and/or the header section. By way of example, the regular expression to detect the header section may be "re.compile (r"^@@-(\d+)(?:,(\d+))?\+(\d+)(?:,(\d+))?\@@[ ]?(.*)")"

At 1304, the system 102 may be configured to execute a pattern matching operation to detect function definitions in the second version of the source code. The pattern matching operation may use regular expressions to detect the function definition. By way of example and not limitation, the system 102 may be configured to detect one or more keywords such as "def", "type", ",", and "return" to detect the function definitions.

At 1306, it may be determined whether a data type associated with each function definition is explicitly defined or not. In some programming languages, the data type (often known as a return type) of the function is explicitly defined. For example, in Java, C, and C++, the data type (or the return type) of any function is explicitly defined. In some programming languages, the data type of the function may not be explicitly defined. Such programming languages may include, but not limited to, Python 2 and Ruby. In case the data type associated with the function definition is explicitly defined, the control may be transferred to 1308. Otherwise, the control may be transferred to 1310.

At 1308, the system 102 may be configured to collect the data type associated with the corresponding function and the data type associated with a set of input parameters of the function. The system 102 may be configured to store the collected data type associated with the corresponding function and the data type associated with the set of input parameters of the function along with a name of the corresponding function in the first database.

At 1310, the system 102 may be configured to analyze the function definition (of a function whose return type is not explicitly defined) to detect the set of input parameters associated with the function. The system 102 may be configured to further analyze the function definition to detect one or more output parameters (or return parameters) of the corresponding function.

At 1312, the system 102 may be configured to collect the data type of each parameter in the detected set of input parameters and the data type of the one or more output parameters of the function. The system 102 may be configured to store the collected data types along with a name of the function in the first database.

Control may pass to end. Although the flowchart 1300 is illustrated as discrete operations, such as 1302, 1304, 1306, 1308, 1310, and 1312. However, in certain embodiments, such discrete operations may be further divided into additional operations, combined into fewer operations, or eliminated, depending on the particular implementation without detracting from the essence of the disclosed embodiments.

Figure 14:
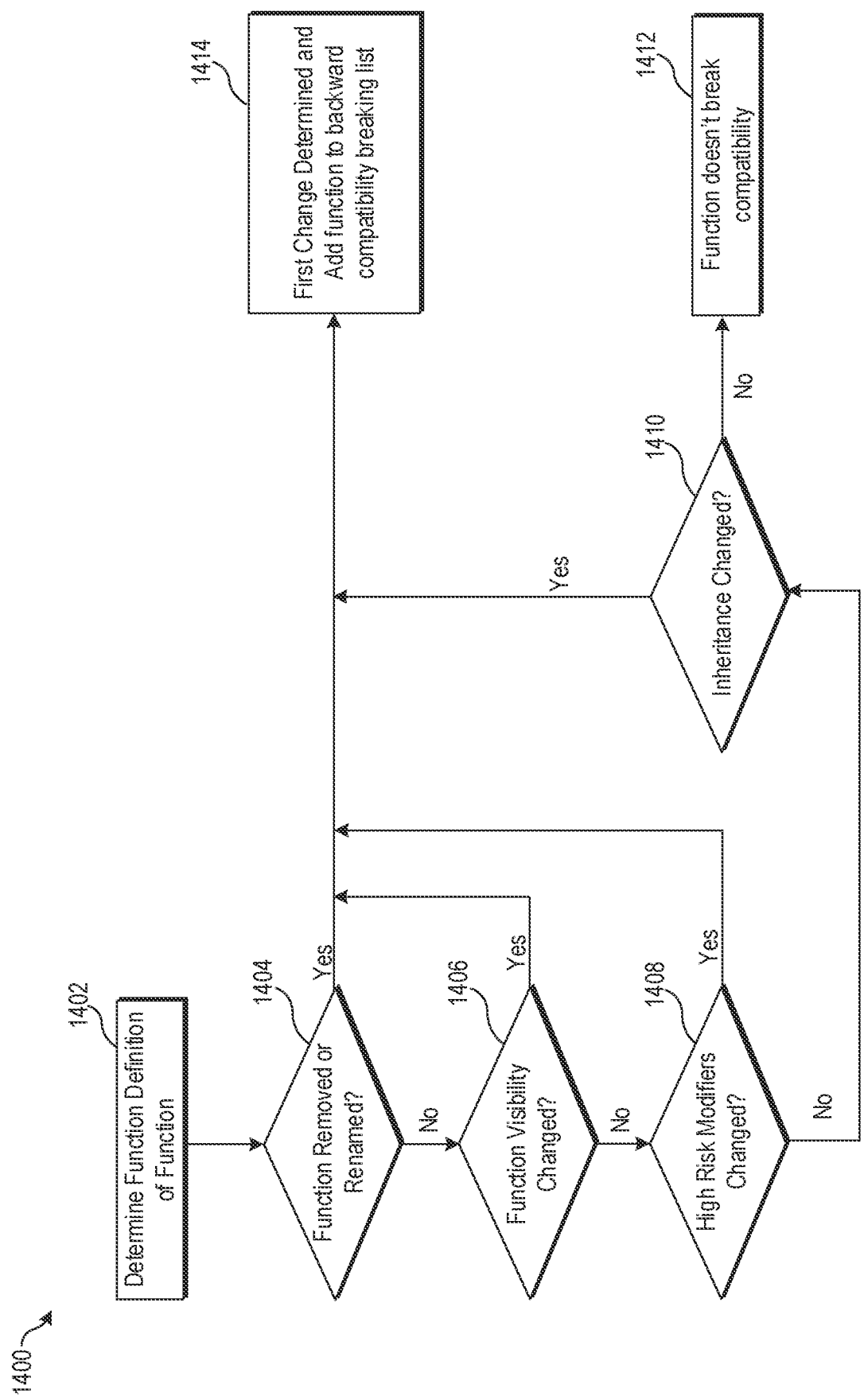
FIG. 14 illustrates a flowchart of an exemplary method for determination of a first change in a function definition of one or more functions.

FIG. 14 illustrates a flowchart of an exemplary method for determination of a first change in a function definition of one or more functions, according to at least one embodiment described in the present disclosure. FIG. 14 is explained in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13. With reference to FIG. 14, there is shown a flowchart 1400. The method illustrated in the flowchart 1400 may start at 1402 and may be performed by any suitable system, apparatus, or device, such as by the system 102 of FIG. 1 or FIG. 2.

At 1402, the system 102 may be configured to determine a function definition of a first function of the one or more functions in a first code chunk of the one or more code chunks. In an embodiment, the system 102 may be configured to determine the function definition based on the special characters ("+" and "−"). As described above the '+' special character may be appended before every new line of code that may be added to the source code of the second version of the software. Similarly, a '−' special character may be added before every line of code that may be present in the first version of the software but absent in the second version of the software. The system 102 may analyze each line that includes the special characters ("+" and "−") to and determines the function definition.

At 1404, it may be determined whether the first function has been removed or renamed in the second version of the source code, with respect to the first version of the code. For example, if a first function (say Fun A 0) was present in the first version of the software and is not present in the second version of the software, then the system 102 may determine that the first function has been either removed or renamed in the second version of the software. Such determination may be based on the special characters associated with the addition or removal of lines in the source code of the second version. In case the first function is present in the second version of the software, then the control may be transferred to 1406. Otherwise, if the first function has been removed or renamed in the second version, then it may be determined as a first change in the function definition and the control may be transferred to 1414.

At 1406, it may be determined whether a visibility of the first function has changed in the second version of the software, with respect to the first version of the software. Specifically, the system 102 may be configured to determine whether or not an access modifier of the first function has changed in the second version in comparison to the first version. Access modifiers may specify an accessibility or a scope of first function. For example, in java, there are four access modifiers, namely private, public, protected, and default. If the first function is defined as "public fun A [ ]" in the first version of the software and the same first function is defined as "private fun A [ ]" in the second version of the software, then the visibility of the first function may be determined to have changed.

In an embodiment, the system 102 may be configured to use regular expressions to determine whether the visibility of the first function has changed or not. In case the visibility of the first function in the first version of the software is same as the visibility of the first function in the second version of the software, then the control may be transferred to 1408. Otherwise, the change in the visibility may be determined as the first change in the function definition and the control may be transferred to 1414.

At 1408, it may be determined whether high risk modifiers of the first function have changed in the second version of the software from the first version of the software. Specifically, the system 102 may be configured to determine whether a specific keyword (such as final, default, static, this, or super) is applied to the first function in the second version of the software. Such keywords may be missing in the first version or may have changed in an update from the first version to the second version. In case the high risk modifiers are not added to the first function in the second version of the software or have not changed in the second version, then the control may be transferred to 1410. Otherwise, if at least one high risk modifier is added to the first function definition in the second version of the software, then the addition may be determined as the first change and the control may be transferred to 1414.

At 1410, it may be determined whether there is a change in inheritance of a class associated with the first function. Inheritance may be defined as a process where one class acquires the properties (methods and fields) of another. In case there is no change in the inheritance of the class between the second version of the software and the first version of the software, then the control may be transferred to 1412. Otherwise the control may be transferred to 1414.

At 1412, the system 102 may output that the first function does not break the compatibility with respect to the function definition. In such a case, no change in the first function may be determined with respect to the first function definition.

At 1414, the first change may be determined and the system 102 may be configured to add the first function to a compatibility breaking list. As discussed above, the first change may be determined based on at least one of the change in a name of the first function, the change in an access modifier of the first function, the change in high risk modifiers of the first function, the removal of the first function, and the change in an inheritance of the first function. The compatibility breaking list may be stored on the first database for further reference.

In case the first change is determined, the system 102 may be further configured to generate the compatibility result. The generated compatibility result may indicate a backward incompatibility of the first function used in the source code of the software application with respect to the second version of the software. The system 102 may be further configured to control the display device 106 based on the generated compatibility result to display the assistive information which informs about an incompatibility of the first function used in the source code of the software application with respect to the second version of the software.

Control may pass to end. Although the flowchart 1400 is illustrated as discrete operations, such as 1402, 1404, 1406, 1408, 1410, 1412, and 1414. However, in certain embodiments, such discrete operations may be further divided into additional operations, combined into fewer operations, or eliminated, depending on the particular implementation without detracting from the essence of the disclosed embodiments.

Figure 15:
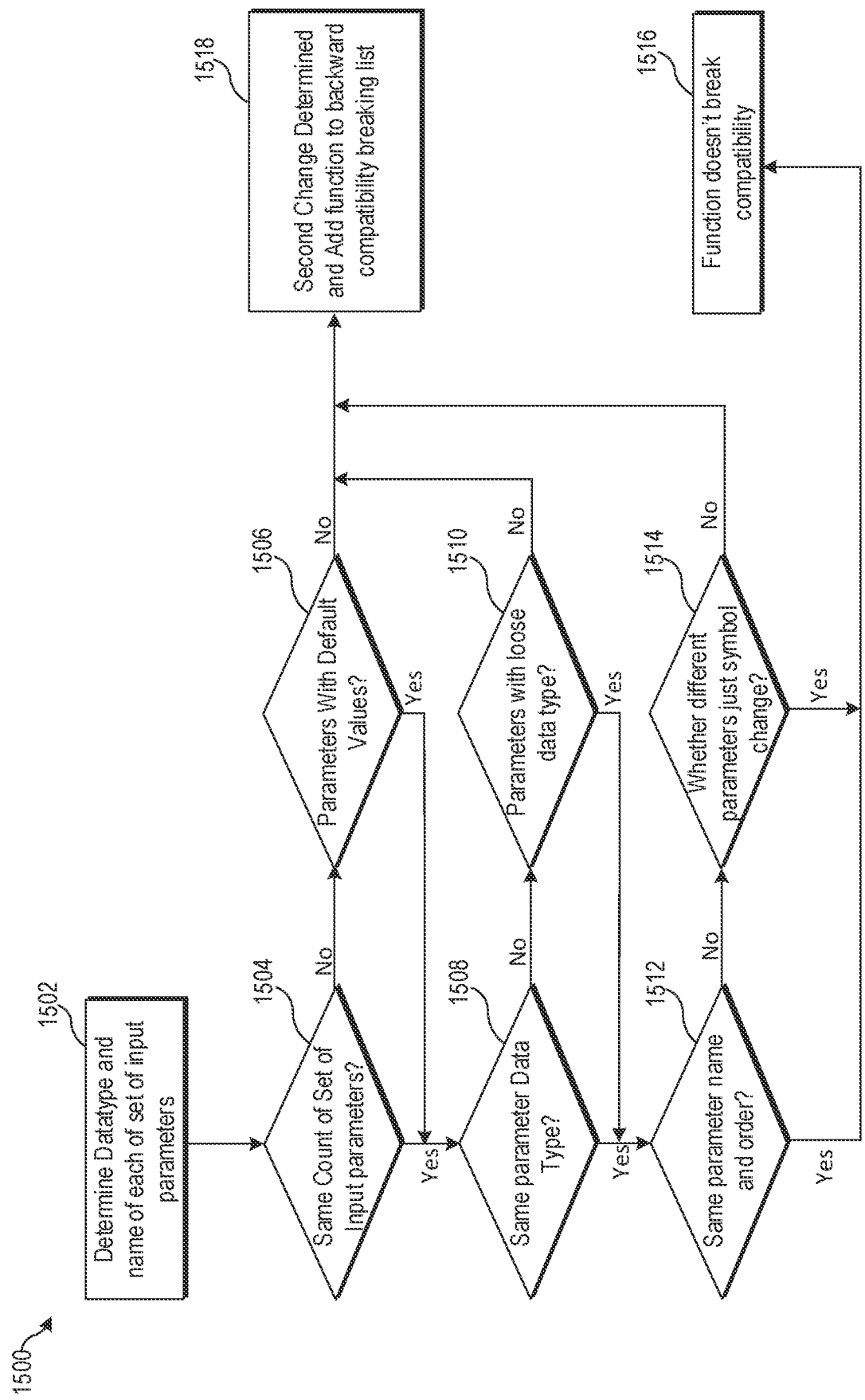
FIG. 15 illustrates a flowchart of an exemplary method for determination of a second change in a set of input parameters of one or more functions.

FIG. 15 illustrates a flowchart of an exemplary method for determination of a second change in a set of input parameters of one or more functions, according to at least one embodiment described in the present disclosure. FIG. 15 is explained in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14. With reference to FIG. 15, there is shown a flowchart 1500. The method illustrated in the flowchart 1500 may start at 1502 and may be performed by any suitable system, apparatus, or device, such as by the system 102 of FIG. 1 or FIG. 2.

At 1502, the system 102 may be configured to determine a data type and a name of each input parameter in a set of input parameters of the first function. In an embodiment, the data type and the name of each input parameter may be determined based on the special characters ("+" and "−") and/or one or more regular expressions.

At 1504, the system 102 may be configured to determine whether a count of the set of input parameters in the second version of the software is same as the count of the set of input parameters in the first version of the software. In case the count is different, the control may be transferred to 1506. Otherwise, the control may be transferred to 1508.

At 1506, it may be determined whether one or more different input parameters in the second version of the software have default values associated with them. Such parameters may include additional parameters that may be presented in the second version of the software, but absent in the first version. In case the one or more different input parameters have default values, then the control may be transferred to 1508. Otherwise, a second change in the set of input parameters of the first function may be determined and the control may be transferred to 1518.

By way of example, and not limitation, if there is a function A defined as "int funA(int x);" in the first version of the software and the same function is defined as "int funA(int x, int y=3);", then the control may be transferred to 1508. In case the same function is defined as "int funA(int x, int y);" in the second version of the software, then the control may be transferred to 1518 as the variable "y" does not have a default value.

At 1508, it may be determined whether each of the set of input parameters is associated with same data type as in the first version of the software. In case the data type associated with the set of input parameters is different in comparison to the first version of the software, the control may be transferred to 1510. Otherwise the control may be transferred to 1512.

At 1510, it may be determined whether each of the one or more different input parameters have a loose data type associated with them. The loose data type may accept values of other data types along with values associated with the loose data type. For example, in C programming language, data type 'float' is primarily used to accept float numbers. However, 'float' can also accept integers. In this case, the compiler will automatically change one type of data into another if it makes sense. For instance, if you assign an integer value to a floating-point variable, the compiler will convert the int to a float. Whereas, the data type 'int' which is primarily used for integer data cannot accept float. Therefore, 'float' may be termed as a loose data type, whereas 'int' may not be considered as a loose data type. In case each of the one or more different input parameters have a loose data type, the control may be transferred to 1512. Otherwise, the control may be transferred to 1518.

At 1512, it may be determined whether each parameter of the set of parameters have same name and order in the second version of the software as in the first version of the software. The order may specific a sequence in which such parameters appear in the function definition of the first function of the one or more functions. In case the set of input parameters have a different name and/or a different order in the second version of the software (in comparison to the first version of the software), the control may be transferred to 1514. Otherwise, the control may be transferred to 1516. As an example, if a variable is defined as "int A" in the first version of the software and "int Z" in the second version of the software, then the control may be transferred to 1514.

At 1514, it may be determined whether each of the one or more different input parameters correspond to just a symbol change. In case such input parameters correspond to just a symbol change, the control may be transferred to 1516. Otherwise, the control may be transferred to 1518.

At 1516, the system 102 may output that the first function does not break the compatibility in relation to the set of input parameters. In such a case, no change in the first function may be determined with respect to the set of input parameters.

At 1518, the second change may be determined and the system 102 may be configured to add the first function to the compatibility breaking list. As discussed above, the second change may be determined based on at least one of the change in a count of input parameters of the first function, the change in default values of the one or more input parameters of the first function, the change in the data type of the one or more input parameters of the first function, the change in a name of the one or more input parameters of the first function, and the change in an order of the one or more input parameters. The compatibility breaking list may be stored in the first database for further references.

In case the second change is determined, the system 102 may be further configured to generate the compatibility result. The generated compatibility result may indicate the backward incompatibility of the first function used in the source code of the software application with respect to the second version of the software. The system 102 may be further configured to control the display device 106 based on the generated compatibility result to display the assistive information, which informs about an incompatibility of the first function used in the source code of the software application with respect to the second version of the software.

Control may pass to end. Although the flowchart 1500 is illustrated as discrete operations, such as 1502, 1504, 1506, 1508, 1510, 1512, 1514, 1516, and 1518. However, in certain embodiments, such discrete operations may be further divided into additional operations, combined into fewer operations, or eliminated, depending on the particular implementation without detracting from the essence of the disclosed embodiments.

Figure 16:
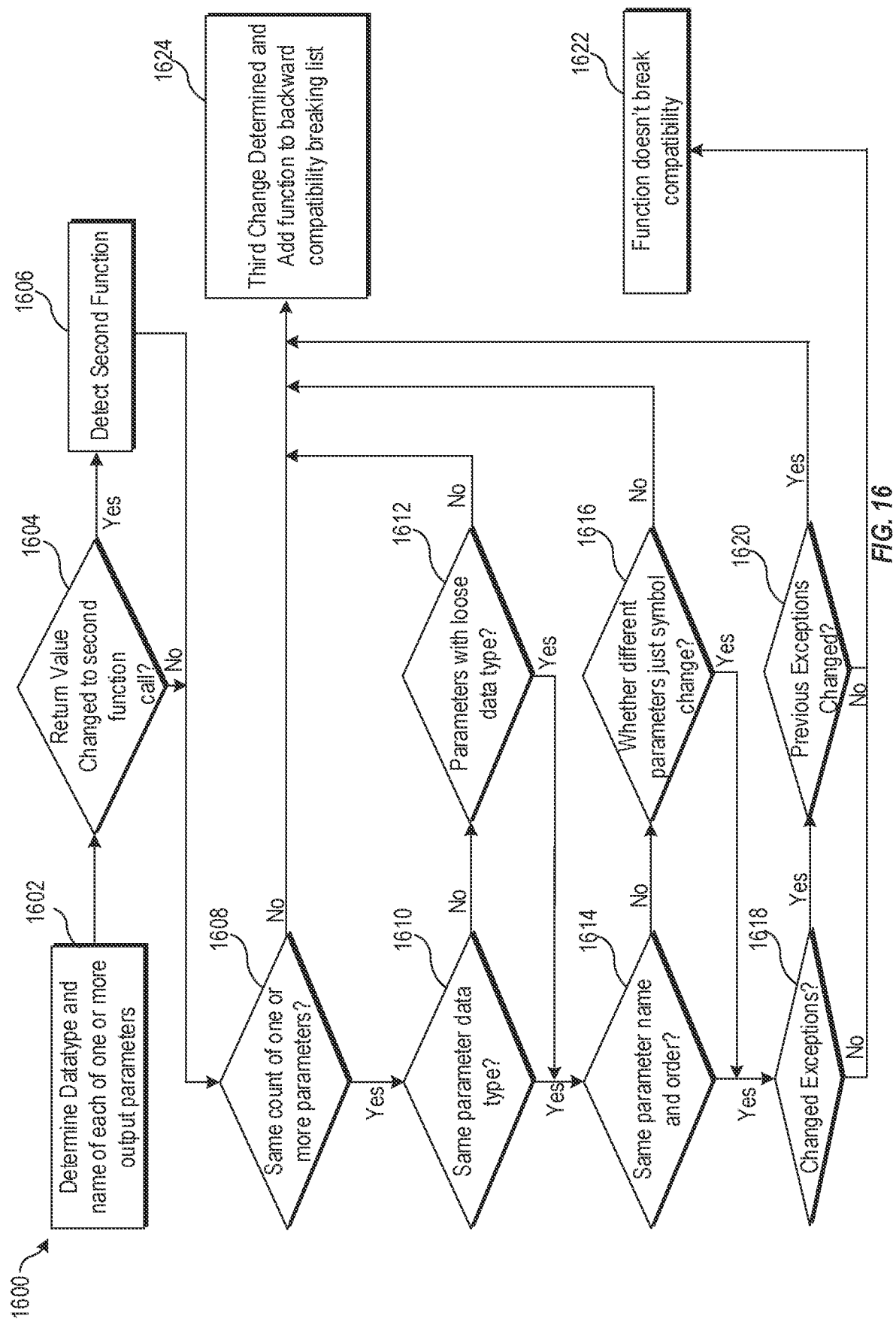
FIG. 16 illustrates a flowchart of an exemplary method for determination of a third change in one or more output parameters of functions.

FIG. 16 illustrates a flowchart of an exemplary method for determination of a third change in one or more output parameters of functions, according to at least one embodiment described in the present disclosure. FIG. 16 is explained in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15. With reference to FIG. 16, there is shown a flowchart 1600. The method illustrated in the flowchart 1600 may start at 1602 and may be performed by any suitable system, apparatus, or device, such as by the system 102 of FIG. 1 or FIG. 2.

At 1602, the system 102 may be configured to determine a data type and a name of each of one or more output parameters of the first function. In an embodiment, the system 102 may be configured to determine a data type and a name of each of the one or more output parameters of the first function based on the special characters ("+" and "−").

At 1604, it may be determined whether or not a return value of the first function is changed to a function call to a second function. The system 102 may determine the return value of the first function in the first version of the software and may compare the determined value with a return value of the first function in the second version of the software. In case the return value of the first function is a call to the second function, the control may be transferred to 1606. Otherwise, the control may be transferred to 1608.

At 1606, the system 102 may be configured to detect the second function to which the call is made by the first function. The system 102 may be configured to analyze the source code of the second version of the software to detect the second function.

At 1608, the system 102 may be configured to determine whether a count of the one or more output parameters of the first function (or the second function) in the second version of the software is same as the count of the set of output parameters of the first function in the first version of the software. In case the determined count is same, the control may be transferred to 1610. Otherwise, the control may be transferred to 1624. As an example, if there is a function A defined as "def funA (x) return m" in the first version of the software and the same function is defined as "def funA (x) return m,n", then the control may be transferred to 1624 as count of the output parameter has increased from 1 in the first version to 2 in the second version.

At 1610, it may be determined whether data types of the one or more output parameters of the first function (or the second function) in the second version of the software is same as the data types of the one or more output parameters in the first version of the software. In case the data types in both the versions are different, the control may be transferred to 1612. Otherwise, the control may be transferred to 1614.

At 1612, it may be determined whether the data type of one or more different output parameters are loose data types. Each of such different output parameters may have a data type that differs between the second version of the software and the first version of the software. In case the data types are loose data types, the control may be transferred to 1614. Otherwise the control may be transferred to 1624.

At 1614, it may be determined whether a name and order of each of the one or more output parameters is same in both the first version and the second version of the software. In case the name and/or order of the one or more output variables is different in the second version in comparison to the first version, the control may be transferred to 1616. Otherwise the control may be transferred to 1618.

At 1616, it may be determined whether or not each of the one or more different output parameters are just a symbol change. In case the one or more different output parameters are just a symbol change, the control may be transferred to 1618. Otherwise, the control may be transferred to 1624.

At 1618, it may be determined whether one or more exceptions have changed from the first version of the software to the second version. In case the one or more exceptions have changed, the control may be transferred to 1620. Otherwise, the control may be transferred to 1622.

At 1620, it may be determined whether changes in the one or more exceptions results in changes in exceptions included in the source code of the software application (associated with the user 112). In case the changes in the one or more exception does not result in the changes in the exceptions of the source code of the software application, the control may be transferred to 1622. Otherwise, the control may be transferred to 1624.

At 1622, the system 102 may output that the first function does not break the compatibility from the perspective of the one or more output parameters. In such a case, no change in the first function may be determined with respect to the set of output parameters.

At 1624, the third change may be determined and the system 102 may be configured to add the first function to the compatibility breaking list. As discussed above, the third change is determined based on at least one of the change in the count of the one or more output parameters of the first function, the change in a data type of the one or more output parameters of the first function, the change in a name of the one or more output parameters of the first function, and the change in an order of the one or more output parameters. The compatibility breaking list may be stored in the first database for further reference.

If the third change is determined, the system 102 may be configured to generate the compatibility result. The generated compatibility result may indicate the backward incompatibility of the first function used in the source code of the software application with respect to the second version of the software. The system 102 may be further configured to control the display device 106 based on the generated compatibility result to display the assistive information which informs about an incompatibility of the first function used in the source code of the software application with respect to the second version of the software.

Control may pass to end. Although the flowchart 1600 is illustrated as discrete operations, such as 1602, 1604, 1606, 1608, 1610, 1612, 1614, 1616, 1618, 1620, 1622, and 1624. However, in certain embodiments, such discrete operations may be further divided into additional operations, combined into fewer operations, or eliminated, depending on the particular implementation without detracting from the essence of the disclosed embodiments.

Figure 17:
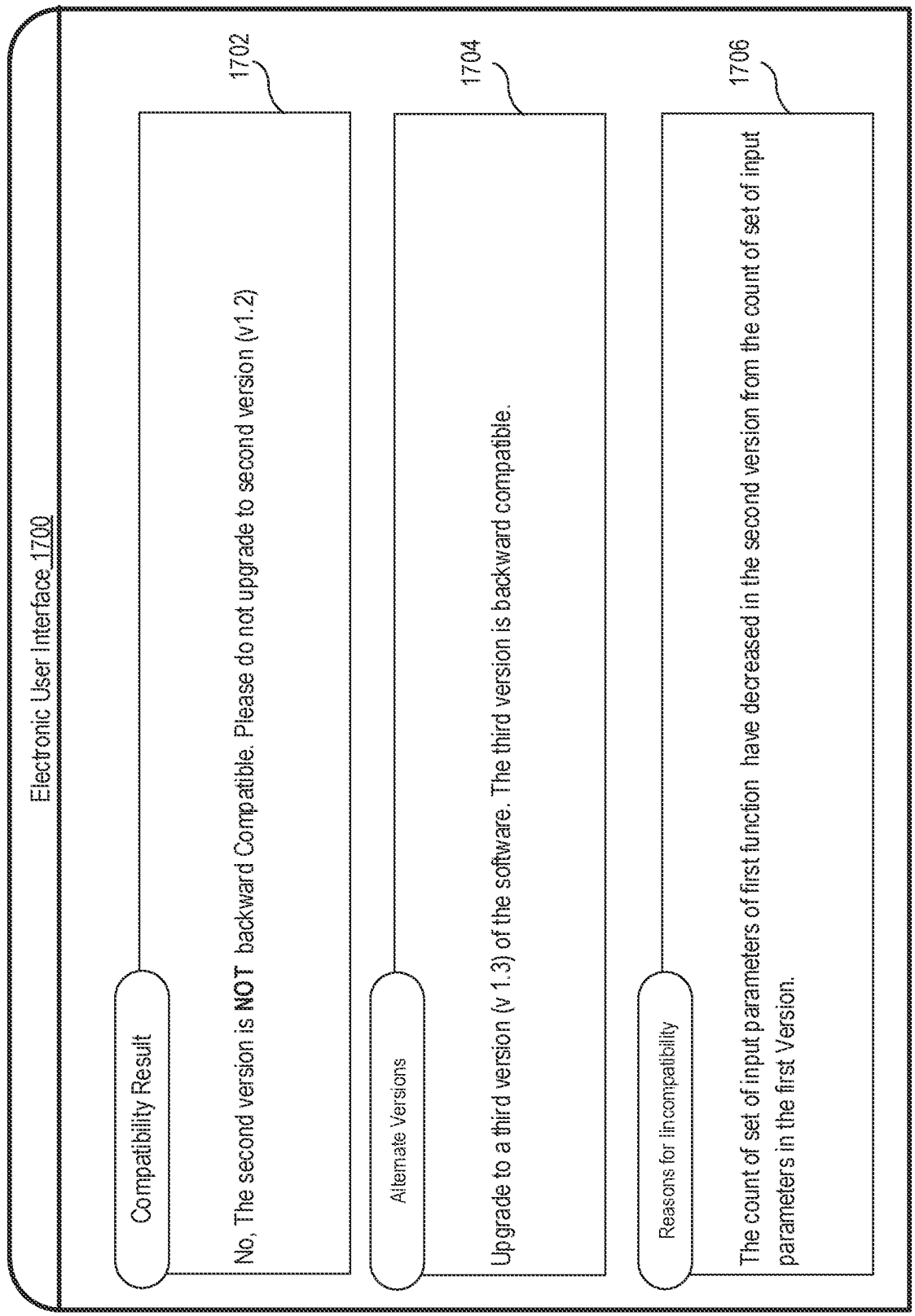
FIG. 17 illustrates an example electronic user interface (UI) for displaying assistive information on a display device.

FIG. 17 illustrates an example electronic user interface (UI) for displaying assistive information on a display device, according to at least one embodiment described in the present disclosure. FIG. 17 is explained in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, and FIG. 16. With reference to FIG. 17, there is shown an electronic UI 1700, which may be an example implementation of the electronic UI 110 of FIG. 1. The electronic UI 1700 may be displayed on the display device 106 based on the generated compatibility result.

On the electronic UI 1700, there is shown a set of UI elements, such as a first UI element 1702, a second UI element 1704, and a third UI element 1706. The first UI element 302 is labelled as, for example, "Compatibility Result". The first UI element 1702 may be a label window that may indicate the compatibility result with respect to the second version of the software. The generated compatibility result may indicate a backward incompatibility or a forward compatibility of the one or more APIs or the functions used in the source code of the software application with respect to the second version of the software. In case the one or more APIs or the functions used in the source code of the software application are backward compatible or forward compatible with respect to the second version of the software, a 'yes' may be displayed in the first UI element 1702. In some embodiments, the first UI element 1702 may also include a first recommendation to update the source code of the software application to be source-code compatible with the second version of the software.

In case the one or more APIs or the functions used in the source code of the software application are not backward compatible or forward compatible with respect to the second version of the software, a 'No' may be displayed in the first UI element 1702. In case the one or more APIs or the functions used in the source code of the software application are not backward compatible or forward compatible with respect to the second version of the software, the second UI element 1704 and the third UI element 1706 may be displayed on the electronic UI 1700.

The second UI element 1704 is labelled as, for example, "Alternate Versions". The second UI element 1704 may be a textbox that may display a second recommendation to upgrade to a third version of the software, which may be different from the first version and the second version of the software. The one or more APIs or the functions used in the source code of the software application may be backward compatible or forward compatible with respect to the third version of the software.

The third UI element 1706 is labelled as, for example, "Reasons for incompatibility". The third UI element 1706 may be a textbox that may display a set of reasons explaining a cause of a backward incompatibility or a forward compatibility of the one or more APIs or the functions used in the source code of the software application with respect to the second version of the software. In an embodiment, the system 102 may be configured to generate the set of reasons, in natural language, that may explain one or more causes of backward incompatibility of the one or more APIs or the functions (used in the source code of the software application) with respect to the second version of the software. For example, the one or more causes may be that the count of input parameters of a first function have decreased from the first version to the second version.

Figure 18:
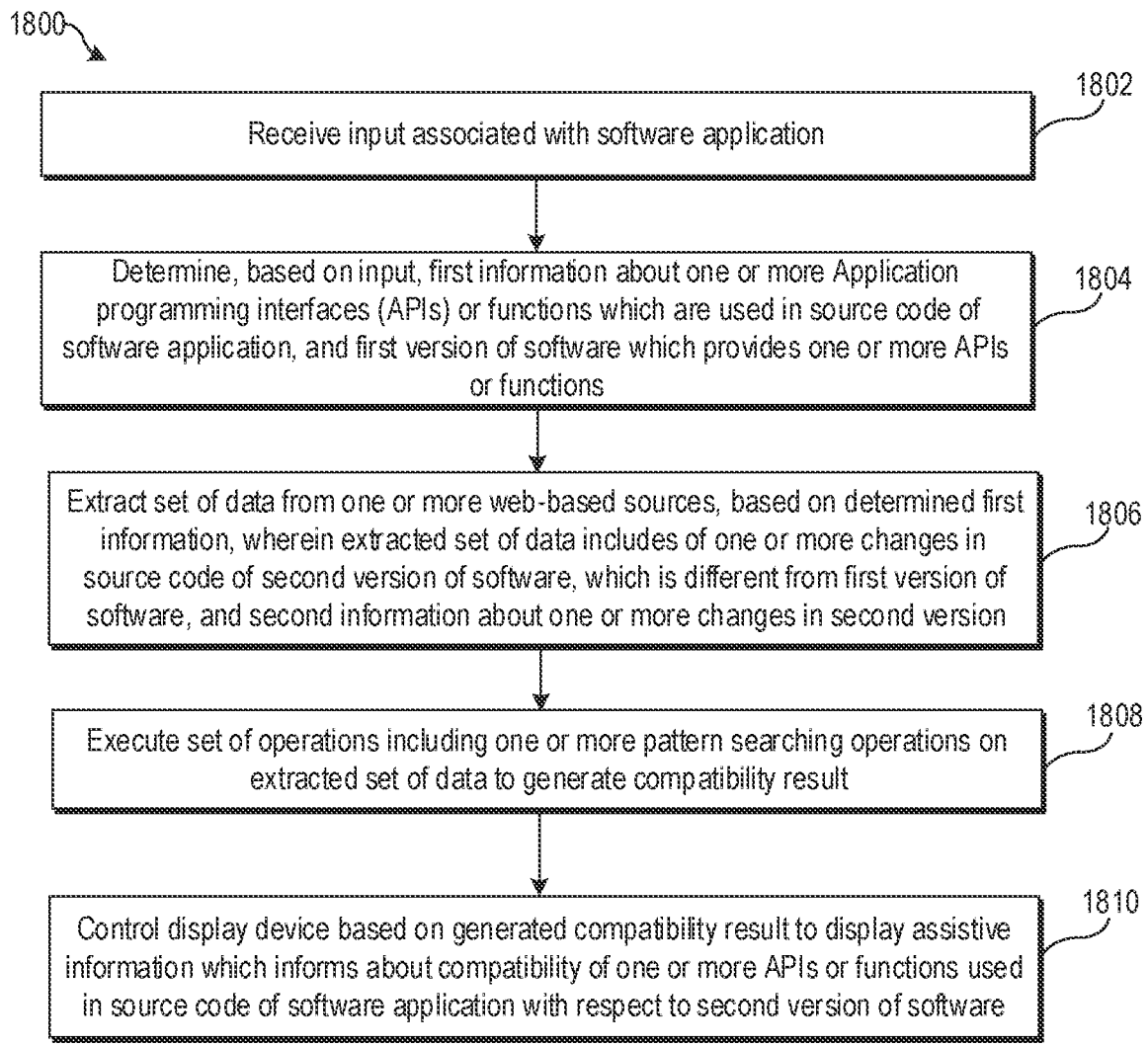
FIG. 18 illustrates a flowchart of an exemplary method for detection of API compatibility across software versions.

FIG. 18 illustrates a flowchart of an exemplary method for detection of API compatibility across software versions, according to at least one embodiment described in the present disclosure. FIG. 18 is explained in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, and FIG. 17. With reference to FIG. 18, there is shown a flowchart 1800. The method illustrated in the flowchart 1800 may start at 1802 and may be performed by any suitable system, apparatus, or device, such as by the system 102 of FIG. 1 or FIG. 2.

At 1802, the input associated with the software application may be received. The received input may include at least one of the source code of the software application, the portion of the source code which may be associated with the one or more APIs or the functions, textual information that includes first data associated with one or more APIs or the functions, second data associated with a name of the software that provides the one or more APIs or the functions, and third data associated with a first version of the software. The details about the reception of the input are provided in FIG. 1 and FIG. 3.

At 1804, the first information may be determined based on the received input. The first information may be about the one or more Application programming interfaces (APIs) or the functions which may be used in a source code of the software application. Additionally, the first information may be about the first version of the software which provides the one or more APIs or the functions. The details about the determination of the first information are provided in FIG. 5.

At 1806, the set of data may be extracted from one or more web-based sources 104. The set of data may be extracted based on the determined first information. The extracted set of data may include one or more changes in a source code of a second version of the software, which may be different from the first version of the software. The extracted set of data may further include second information about the one or more changes in the second version. The details about the extraction of the set of data are provided, for example, in FIGS. 6,7,9, and 11.

At 1808, the set of operations may be executed. The set of operations may include one or more pattern searching operations. The set of operations may be executed on the extracted set of data to generate a compatibility result. The compatibility result may be generated on the one or more code changes and the second information.

In some embodiments, the compatibility result may be generated based on at least two of the first file, the second file, the third file, the set of first messages, or the set of second messages. In an embodiment, the compatibility result may be generated based on a vote based approach. For example, if the execution of the set of operations on the first file indicate that a first API is backward incompatible, the execution of the set of operations on the second file indicate that the first API is backward incompatible, and the execution of the set of operations on the set of first messages indicate that the first API is backward compatible, the generated compatibility result may indicate that the first API is backward incompatible as two out of three results were indicating that the first API is backward incompatible.

In another embodiments, the compatibility result may be generated based on a weight-based approach. In such a scenario, a weight may be assigned with the compatibility result generated based on execution of the set of operations each of the first file, the second file, the set of first messages and the set of second messages. The details about the determination of the compatibility results are provided, for example, in FIGS. 8,10, and 12.

At 1810, the display device 106 may be controlled based on the generated compatibility result. The display device 106 may be controlled to display assistive information which informs about a compatibility of the one or more APIs or the functions used in the source code of the software application with respect to the second version of the software. The details about displaying the assistive information are provided from FIG. 17.

Control may pass to end. Although the flowchart 1800 is illustrated as discrete operations, such as 1802, 1804, 1806, 1808, and 1810. However, in certain embodiments, such discrete operations may be further divided into additional operations, combined into fewer operations, or eliminated, depending on the particular implementation without detracting from the essence of the disclosed embodiments.

In an embodiment, the system 102 may be configured to perform the extraction of the set of data and the execution of the set of operations before receiving the input as described in FIG. 4. The system 102 may be further configured to store a set of results of compatibility in a database (or the first database) based on the performing the extraction of the set of data and the execution of the set of operations. By way of example and not limitation, a first table of the first database is provided in Table 2 as follows:

TABLE 2

Compatibility Result For each version of first software.

| Software Name | Version | API/Function that breaks compatibility | Input | Output |
|---|---|---|---|---|
| Software 1 | 1.1 | API 1 | X, Y | Z |
| Software 1 | 1.2 | API 1 | X | Z |

TABLE 2-continued

Compatibility Result For each version of first software.

| Software Name | Version | API/Function that breaks compatibility | Input | Output |
|---|---|---|---|---|
| Software 1 | 1.3 | API 1 | X, Y | Z1, Z2 |
| Software 1 | 1.3.1 (unreleased) | API 1 | X, Y | Z |

At any time-instant, the system 102 may receive an input and may query the database based on the received input. In some cases, an API may be changed back-and-forth, in particular among some pre-released versions. For example, in Table 2, API 1 is not backward compatible from v1.1 to v1.2 and v1.3. However, in a version v1.3.1, API 1 is changed back to its original format as v1.1. In such cases, by looking up the above Table, the backward compatibility can be determined. For example, if user wants upgrade from v1.1 to v1.3, API 1 breaks the backward compatibility, whereas if user want to from v1.1 to v1.3.1, API 1 doesn't break the backward compatibility.

In an embodiment, the compatibility result associated with the received input may be present in the database. In such an embodiment, the system 102 may retrieve the compatibility result from the database and may control the display device 106 to display assistive information based on the compatibility result. In scenarios where the result is already stored on the database, the system 102 may be said to work in a pre-processing mode. In the pre-processing mode, the time taken to display the assistive information may be quick as the results may be already stored on the database.

In another embodiment, the compatibility result associated with the received input may not be present in the database. In such an embodiment, the system 102 may extract the set of data from the one or more web-based sources 104 and may execute the set of operations to generate the compatibility. In scenarios where the result is not stored on the database, the system 102 may be said to work in a dynamic mode. In the dynamic mode, there is no requirement of maintaining the database. The time taken to display the assistive information may be more in the dynamic mode in comparison to the pre-processing mode.

In an embodiment, the system 102 may execute in hybrid mode (i.e. in both the pre-processing mode and the dynamic mode). In such a scenario, the system 102 may be configured to receive the input and may retrieve the compatibility result associated with the first input from the database (as done in case of the pre-processing mode). In case the compatibility result associated with the input is not present in the database, the system 102 may be configured to extract the data from one or more web-based sources 104 and may execute the set of operations to generate the compatibility result for the received input (as done in case of dynamic mode).

In an embodiment, the system 102 may be configured to extract the set of data from the first database instead of the one or more web-based sources 104 and may execute the set of operations to generate the compatibility result. In another embodiment, the compatibility results for different versions of each software in a collection may already be stored on the first database. In such an embodiment, the system 102 may be configured to retrieve the compatibility results from the first database and may control the display device 106 based on the retrieved compatibility result.

Various embodiments of the disclosure may provide one or more non-transitory computer-readable storage medium configured to store instructions that, in response to being executed, cause a system (such as the system 102) to perform operations. The operations may include receiving an input associated with a software application. The operation may further include determining first information about one or more Application programming interfaces (APIs) or functions which are used in a source code of the software application and a first version of a software which provides the one or more APIs or the functions based on based on the input. The operation may further include extracting a set of data from one or more web-based sources(such as the one or more web-based sources 104) based on the determined first information. The extracted set of data may include one or more changes in a source code of a second version of the software and second information about the one or more changes in the second version. The second version of the software may be different from the first version of the software. The operations may further include executing a set of operations including one or more pattern searching operations on the extracted set of data to generate a compatibility result. The operations may further include controlling a display device (such as the display device 106) based on the generated compatibility result. The display device may be controlled to display assistive information which informs about a compatibility of the one or more APIs or the functions used in the source code of the software application with respect to the second version of the software.

As indicated above, the embodiments described in the present disclosure may include the use of a special purpose or general-purpose computer (e.g., the processor 202 of FIG. 2) including various computer hardware or software modules, as discussed in greater detail below. Further, as indicated above, embodiments described in the present disclosure may be implemented using computer-readable media (e.g., the memory 204 or the persistent data storage 206 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
receiving an input associated with a software application;
determining, based on the input, first information about:
one or more Application programming interfaces (APIs) or functions which are used in a source code of the software application, and
a first version of a software which provides the one or more APIs or the functions, and
extracting a set of data from one or more web-based sources, based on the first information, the set of data comprises:
one or more changes in a source code of a second version of the software, which is different from the first version of the software, and
second information about the one or more changes in the second version;
executing a set of operations, including one or more pattern searching operations on the set of data to generate a compatibility result;
controlling a display device based on the compatibility result, to display assistive information about a compatibility of the one or more APIs or the functions used in the source code of the software application with respect to the second version of the software; and
collecting a merged date for a selected first message, the merged date corresponding to a date when a first message is associated with a specific version of the software,
the input comprises a portion of the source code which is associated with the functions and textual information,
the textual information comprises first data associated with the one or more APIs or the functions, second data associated with a name of the software that provides the one or more APIs or the functions, and third data associated with the first version of the software.

2. The method according to claim 1, wherein the software is an open source software (OSS) or a proprietary software.

3. The method according to claim 1, further comprising:
determining a collection of software, that provides a collection of APIs or functions, hosted on the one or more web-based sources;
collecting, from the one or more web-based sources, software metadata for each software of the determined collection of software,
wherein the software metadata comprises at least one of a name of the software, one or more versions of each software of the collection of software, and information about programming languages used in each of the one or more versions of each software;
collecting, from the one or more web-based sources, API metadata associated a set of APIs included in each of the one or more versions; and
storing the software metadata and the API metadata in a first database,
wherein the first information is determined from the first database.

4. The method according to claim 3, wherein the input includes the source code of the software application.

5. The method according to claim 4, further comprising:
read the source code included in the input;
analysing one or more definition files associated with the read source code to determine version information of the software; and
querying the first database using the version information to determine the first information about the one or more APIs or functions which are used in the source code of the software application.

6. The method according to claim 1, wherein the extracted set of data comprises of:
a first file that includes the source code of the second version of the software,
a second file that includes the second information,
a third file that includes a description of the software, and
a set of first messages associated with one or more changes introduced in the source code of the second version of the software.

7. The method according to claim 1, wherein the execution further comprises:
executing a first pattern searching operation of the set of operations on the set of data to detect one or more tags associated with the compatibility in the set of data;
extracting one or more sentences associated with the one or more tags;
determining a first set of API names or function names mentioned in the one or more sentences; and
determining whether the first set of API names or the function names include names of the one or more APIs or the functions used in the source code of the software application,
wherein the compatibility result is generated further based on the determination that the first set of API names or the function names include the names of the one or more APIs or the functions used in the source code of the software application.

8. The method according to claim 7, wherein the compatibility result comprises of changes in one or more of:
a definition of a first function of the functions or a first API of the one or more APIs,
one or more input parameters associated with the first function or the first API, and
one or more output parameters associated with the first function or the first API.

9. The method according to claim 1, wherein the execution further comprises:
collecting, from the extracted set of data, one or more code chunks which corresponds to the one or more changes in the source code of the second version of the software with respect to a source code of the first version of the software; and
executing a second pattern searching operation of the set of operations on the one or more code chunks to generate the compatibility result.

10. The method according to claim 9, wherein the second pattern searching operation is executed by determining from the one or more code chunks:
a first change associated with a definition of a first function of one or more functions,
a second change of the one or more changes in a set of input parameters of the first function, and
a third change of the one or more changes in one or more output parameters of the first function, wherein the compatibility result is generated further based on at least one of the first change, the second change, and the third change.

11. The method according to claim 10, wherein the first change is determined based on at least one of:
a change in a name of the first function,
a change in an access modifier of the first function,
a removal of the first function, and
a change in an inheritance of the first function.

12. The method according to claim 10, wherein the second change is determined based on at least one of:
a change in a count of input parameters of the first function,
a change in default values of the one or more input parameters of the first function,
a change in a data type of the one or more input parameters of the first function,
a change in a name of the one or more input parameters of the first function, and
a change in an order of the one or more input parameters.

13. The method according to claim 10, wherein the third change is determined based on at least one of:
a change in a count of the one or more output parameters of the first function,
a change in a data type of the one or more output parameters of the first function,
a change in a name of the one or more output parameters of the first function, and
a change in an order of the one or more output parameters.

14. The method according to claim 1, further comprising:
performing the extraction of the set of data and the execution of the set of operations before receiving the input;
storing a set of results of compatibility in a database based on the performing; and
querying the database based on the received input, to generate the compatibility result.

15. The method according to claim 1, wherein the compatibility result indicates a backward incompatibility of the one or more APIs or the functions used in the source code of the software application with respect to the second version of the software.

16. The method according to claim 1, wherein the assistive information comprises one or more of:
a first recommendation to update the source code of the software application to be source-code compatible with the second version of the software,
a second recommendation to upgrade to a third version of the software, which is different from the first version or the second version of the software, and
a set of reasons explaining a cause of a backward incompatibility of the one or more APIs or the functions used in the source code of the software application with respect to the second version of the software.

17. A non-transitory computer-readable storage medium configured to store instructions that, in response to being executed, causes a system to perform operations, the operations comprising:
receiving an input associated with a software application;
determining, based on the input, first information about:
one or more Application programming interfaces (APIs) or functions which are used in a source code of the software application, and
a first version of a software which provides the one or more APIs or the functions, and
extracting a set of data from one or more web-based sources, based on the first information, the set of data comprises of:
one or more changes in a source code of a second version of the software, which is different from the first version of the software, and
second information about the one or more changes in the second version;
executing a set of operations, including one or more pattern searching operations on the set of data to generate a compatibility result;
controlling a display device based on the compatibility result, to display assistive information about a compatibility of the one or more APIs or the functions used in the source code of the software application with respect to the second version of the software; and
collecting a merged date for a selected first message, the merged date corresponding to a date when a first message is associated with a specific version of the software,
the input comprises a portion of the source code which is associated with the functions and textual information,
the textual information comprises first data associated with one or more APIs or the functions, second data associated with a name of the software that provides the one or more APIs or the functions, and third data associated with the first version of the software.

18. The non-transitory computer-readable storage medium according to claim 17, wherein the operations further comprise:
executing a first pattern searching operation of the set of operations on the set of data to detect one or more tags associated with the compatibility in the set of data;
extracting one or more sentences associated with the one or more tags;
determining a first set of API names or function names mentioned in the one or more sentences; and
determining whether the first set of API names or the function names include names of the one or more APIs or the functions used in the source code of the software application,
wherein the compatibility result is generated further based on the determination that the first set of API names or the function names include the names of the one or more APIs or the functions used in the source code of the software application.

19. A system, comprising:
a processor configured to:
receive an input associated with a software application;
determine, based on the input, first information about:
one or more Application programming interfaces (APIs) or functions which are used in a source code of the software application, and
a first version of a software which provides the one or more APIs or the functions, and
extract a set of data from one or more web-based sources, based on the first information, the set of data comprises of:
one or more changes in a source code of a second version of the software, which is different from the first version of the software, and
second information about the one or more changes in the second version;
execute a set of operations, including one or more pattern searching operations on the set of data to generate a compatibility result;
control a display device based on the compatibility result, to display assistive information about a compatibility of the one or more APIs or the functions used in the source code of the software application with respect to the second version of the software; and collect a merged date for a selected first message, the merged date corresponding to a date when a first message is associated with a specific version of the software, the input comprises a portion of the source code which is associated with the functions and textual information, the textual information comprises first data associated with one or more APIs or the functions, second data associated with a name of the software that provides the one or more APIs or the functions, and third data associated with the first version of the software.

\* \* \* \* \*